(12) United States Patent
Shimasawa et al.

(10) Patent No.: US 10,539,193 B2
(45) Date of Patent: Jan. 21, 2020

(54) METHOD FOR MANUFACTURING OUTER JOINT MEMBER FOR CONSTANT-VELOCITY UNIVERSAL JOINT AND OUTER JOINT MEMBER

(71) Applicant: NTN CORPORATION, Osaka (JP)

(72) Inventors: Takeshi Shimasawa, Shizuoka (JP); Naoki Nakagawa, Shizuoka (JP); Tsuneaki Hiraoka, Shizuoka (JP); Shintaro Suzuki, Shizuoka (JP); Tatsuro Sugiyama, Shizuoka (JP); Masazumi Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 225 days.

(21) Appl. No.: 15/319,619

(22) PCT Filed: May 20, 2015

(86) PCT No.: PCT/JP2015/064497
§ 371 (c)(1),
(2) Date: Dec. 16, 2016

(87) PCT Pub. No.: WO2015/194305
PCT Pub. Date: Dec. 23, 2015

(65) Prior Publication Data
US 2017/0130780 A1    May 11, 2017

(30) Foreign Application Priority Data
Jun. 18, 2014    (JP) .................................. 2014-125497

(51) Int. Cl.
*F16D 3/223*    (2011.01)
*B23K 15/00*    (2006.01)
(Continued)

(52) U.S. Cl.
CPC .......... *F16D 3/223* (2013.01); *B23K 15/0053* (2013.01); *B23K 26/28* (2013.01);
(Continued)

(58) Field of Classification Search
CPC .... B23K 15/00; B23K 15/0053; B23K 26/21; B23K 26/28; F16D 1/068; F16D 3/20;
(Continued)

(56) References Cited

U.S. PATENT DOCUMENTS 3,715,935 A * 2/1973 Ebey ...................... F16H 57/023
301/131
4,116,020 A * 9/1978 Aucktor ................ F16D 3/2237
464/145

(Continued)

FOREIGN PATENT DOCUMENTS

JP           4-200887         7/1992
JP      2002295507 A  *  10/2002
(Continued)

OTHER PUBLICATIONS

International Search Report dated Aug. 18, 2015 in corresponding International (PCT) Application No. PCT/JP2015/064497.
(Continued)

*Primary Examiner* — Jacob J Cigna
(74) *Attorney, Agent, or Firm* — Wenderoth, Lind & Ponack, L.L.P.

(57) ABSTRACT

A method of manufacturing an outer joint member of a constant velocity universal joint includes forming cup and shaft members of medium carbon steel, preparing, as the cup member, a cup member having cylindrical and bottom portions integrally formed by forging, and a joining end surface formed on an outer surface of the bottom portion, and preparing, as the shaft member, a shaft member having a joining end surface to be joined to the bottom portion of
(Continued)

the cup member. The method also includes bringing the joining end surfaces of the cup and shaft members into abutment against each other, and welding the cup and shaft members from an outer side of the cup member to an abutment portion between the cup and shaft members in a radial direction of the cup members.

4 Claims, 20 Drawing Sheets

(51) Int. Cl.
  *B23K 26/28* (2014.01)
  *F16D 1/068* (2006.01)
  *F16D 3/205* (2006.01)
(52) U.S. Cl.
  CPC ............ *F16D 1/068* (2013.01); *F16D 3/205* (2013.01); *F16D 2003/22326* (2013.01); *F16D 2250/0076* (2013.01)
(58) Field of Classification Search
  CPC ............... F16D 3/205; F16D 3/223; F16D 2003/22326; F16D 2250/0076
  See application file for complete search history.

(56) References Cited

U.S. PATENT DOCUMENTS

| | | | | |
|---|---|---|---|---|
| 4,242,888 | A * | 1/1981 | Komeiji | F16D 3/207 228/114.5 |
| 4,610,643 | A * | 9/1986 | Krude | F16D 3/2233 464/143 |
| 5,205,464 | A * | 4/1993 | Simon | B21K 1/063 228/114 |
| 5,333,939 | A * | 8/1994 | Krude | B60B 27/0005 301/124.1 |
| 5,444,206 | A | 8/1995 | Isshiki et al. | |
| 5,451,185 | A * | 9/1995 | Krude | B21K 1/762 464/145 |
| 5,498,849 | A | 3/1996 | Isshiki et al. | |
| 5,885,162 | A * | 3/1999 | Sakamoto | F16D 1/068 464/145 |
| 5,947,826 | A * | 9/1999 | Seguin | F16D 3/2237 464/145 |
| 6,406,374 | B1 * | 6/2002 | Kanamaru | B21D 26/047 403/359.1 |
| 7,670,229 | B2 * | 3/2010 | Disser | F16D 3/065 464/162 |
| 9,746,036 | B2 * | 8/2017 | Tosaji | F16C 3/023 |
| 2005/0028341 | A1 * | 2/2005 | Durand | B21C 37/16 29/421.1 |
| 2005/0115296 | A1 * | 6/2005 | Sato | B21C 23/20 72/354.8 |
| 2007/0280778 | A1 * | 12/2007 | Yamazaki | B62D 1/16 403/76 |
| 2008/0044223 | A1 * | 2/2008 | Dagonneau | F16D 1/027 403/359.1 |
| 2008/0242432 | A1 * | 10/2008 | Disser | F16D 3/065 464/145 |
| 2010/0119300 | A1 * | 5/2010 | Nakagawa | F16D 1/068 403/271 |
| 2011/0269555 | A1 * | 11/2011 | Morimoto | C21D 1/10 464/106 |
| 2014/0291301 | A1 * | 10/2014 | Tosaji | F16C 3/023 219/121.14 |

FOREIGN PATENT DOCUMENTS

| | | | | |
|---|---|---|---|---|
| JP | 2006-112596 | | 4/2006 | |
| JP | 2011-106569 | | 6/2011 | |
| JP | 2011-117509 | | 6/2011 | |
| JP | 2011-226589 | | 11/2011 | |
| JP | 2012-57696 | | 3/2012 | |
| JP | 2012057696 | A * | 3/2012 | ........... B23K 20/129 |
| JP | 2012229714 | A * | 11/2012 | |
| JP | 2013-100859 | | 5/2013 | |
| JP | 2013-245806 | | 12/2013 | |
| WO | WO-2013069433 | A1 * | 5/2013 | .............. F16C 3/023 |

OTHER PUBLICATIONS

International Preliminary Report on Patentability and Written Opinion of the International Searching Authority dated Dec. 20, 2016 in corresponding International (PCT) Application No. PCT/JP2015/064497.
Nikkan Kogyo Shimbun, Ltd., Website Article, http://www.nikkan.co.jp/news/nkx0420140521beaj.html, May 21, 2014, with English statement of relevance.
NTN Corporation, Website Article, http://www.ntn.co.jp/japan/news/new_products/news201400038.html, dated May 22, 2014, with English statement of relevance.
Nikkei Business Publications, Inc., Website Article, http://techon.nikkeibp.co.jp/article/EVENT/20140522/353568, dated May 22, 2014, with English statement of relevance.
Sanpo Publications, Inc., Website Article, http://www.sanpo-pub.co.jp/topnews/2014/0523016259.html, dated Jun. 5, 2014, with English statement of relevance.
Mechanical-Tech, Inc., Website Article, http://mechanical-tech.jp/node/5915, dated May 24, 2014, with English statement of relevance.
IDD, Inc., Website Article, http://response.jp/article/2014/05/26/223911.html, dated May 26, 2014, with English statement of relevance.
Carview Corporation, Website Article, http://carview.yahoo.co.jp/news/market/20140526-10204741-carview/, dated May 26, 2014, with English statement of relevance.
Yahoo Japan Corporation, Website Article, http://headlines.yahoo.co.jp/hl?a=20140526-00000002-rps-bus_all, dated May 26, 2014, with English statement of relevance.
Nikkan Kogyo Shimbun Ltd, Published Article, dated May 21, 2014, with English statement of relevance.
Nikkei Inc., Published Article, dated May 22, 2014, with English statement of relevance.
Nikkan Jidosha Shimbun Inc., Published Article, dated May 26, 2014, with English statement of relevance.
NTN Corporation, Exhibition at the Automotive Engineering Exposition 2014, Society of Automotive Engineers of Japan, Inc., Pacifico Yokohama, May 21-23, 2014, With English statement of relevance.

* cited by examiner

METHOD FOR MANUFACTURING OUTER JOINT MEMBER FOR CONSTANT-VELOCITY UNIVERSAL JOINT AND OUTER JOINT MEMBER

TECHNICAL FIELD

The present invention relates to a method of manufacturing an outer joint member of a constant velocity universal joint and an outer joint member.

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft configured to transmit power from an engine of an automobile to a driving wheel, for example, the plunging type constant velocity universal joint is used on a differential side (inboard side), and the fixed type constant velocity universal joint is used on a driving wheel side (outboard side).

Irrespective of the plunging type and the fixed type, the constant velocity universal joint includes, as main components, an outer joint member including a cup section having track grooves formed in an inner peripheral surface thereof and engageable with torque transmitting elements, and a shaft section that extends from a bottom portion of the cup section in an axial direction. In many cases, the outer joint member is constructed by integrally forming the cup section and the shaft section by subjecting a rod-like solid blank (bar material) to plastic working such as forging and ironing or processing such as cutting work, heat treatment, and grinding.

Incidentally, as the outer joint member, an outer joint member including a long shaft section (long stem) may sometimes be used. In order to equalize lengths of a right intermediate shaft and a left intermediate shaft, the long stem is used for an outer joint member on the inboard side that corresponds to one side of the drive shaft. The long stem is rotatably supported by a rolling bearing. Although varied depending on vehicle types, the length of the long stem section is approximately from 300 mm to 400 mm in general. In the outer joint member, the long shaft section causes difficulty in integrally forming the cup section and the shaft section with high accuracy. Therefore, there is known an outer joint member in which the cup section and the shaft section are formed as separate members, and both the members are joined through friction press-contact. Such a friction press-contact technology is described in, for example, Patent Document 1.

An overview of the friction press-contact technology for the outer joint member described in Patent Document 1 is described with reference to FIG. 19 and FIG. 20. An intermediate product 71' of an outer joint member 71 includes a cup member 72 and a shaft member 73, which are joined through the friction press-contact. As illustrated in FIG. 19, burrs 75 are generated in at least one of inner and outer diameter portions on a joining portion 74 along with the press-contact. In order to mount a rolling bearing (see FIG. 1) to a shaft section of the intermediate product 71' of the outer joint member 71, as illustrated in FIG. 20, it is necessary to remove the burrs 75 on the radially outer side of the joining portion 74 through processing such as turning. Although illustration is omitted, the intermediate product 71' is processed into a finished product of the outer joint member 71 through machining of a spline, snap ring grooves, and the like, and through heat treatment, grinding, and the like. Therefore, the outer joint member 71 and the intermediate product 71' have slight differences in shape, but illustration of the slight differences in shape is omitted in FIG. 20 to simplify the description, and the outer joint member 71 being the finished product and the intermediate product 71' are denoted by the reference symbols at the same parts. The same applies to the description below.

PRIOR ART DOCUMENTS

Patent Documents

Patent Document 1: JP 2012-57696 A

SUMMARY OF THE INVENTION

Problems to be Solved by the Invention

The burrs 75 on the joining portion 74 generated due to the friction press-contact described above are quenched by friction heat and cooling that follows the friction heat. Thus, the burrs 75 have a high hardness and a distorted shape extended in a radial direction and an axial direction. Therefore, as illustrated in FIG. 20, when removing the burrs 75 on the radially outer side through the turning, a tip for turning is liable to be significantly abraded due to the high hardness and cracked due to the distorted shape. Therefore, it is difficult to increase the turning speed. In addition, the cutting amount per pass of the tip for turning is decreased, and hence the number of passes is increased, which causes a problem in that the cycle time is increased to increase manufacturing cost.

Further, in order to inspect a joining state of the joining portion 74 of the outer joint member 71, when ultrasonic flaw detection, which enables flaw detection at high speed, is to be performed, an ultrasonic wave is scattered due to the burrs 75 remaining on the radially inner side of the joining portion 74, and hence the joining state cannot be checked. Therefore, there occurs a problem in that total inspection through the ultrasonic flaw detection cannot be performed after the joining.

In view of the above-mentioned problems, when the components are joined through laser welding or electron beam welding, the surfaces of the joining portion may be prevented from being increased in thickness unlike the case of the friction press-contact. However, when the cup member 72 and the shaft member 73 as illustrated in FIG. 21 are brought into abutment against each other to be welded, a gas pressure in a hollow cavity portion 76 is increased due to processing heat during the welding, and after completion of the welding, the pressure is decreased. Due to the variation in the internal pressure of the hollow cavity portion 76, blowing of a molten material occurs. Thus, a recess is formed on radially outer surfaces of the welded portion, poor welding in terms of depth occurs, and air bubbles are generated inside the welded portion, thereby degrading the welding state. As a result, the strength of the welded portion is not stable, which adversely affects quality.

In addition, the inventors of the present invention have focused on the fact that, in the outer joint member of the constant velocity universal joint being a mass-produced product for automobiles and the like, it is essential to increase quality and reliability of the welded portion of the cup member 72 and the shaft member 73.

In addition, the cup member 72 and the shaft member 73, which are joined through the friction press-contact as illustrated in FIG. 19 and FIG. 20 or joined by welding as illustrated in FIG. 21 as described above, are joined at an intermediate position on the entire shaft section having a shape and dimensions different for each vehicle type. Accordingly, as described later, it was found that there is also a problem in terms of cost reduction achieved through enhancement of productivity and standardization of a product type of the cup member.

The present invention has been proposed in view of the above-mentioned problems, and has an object to provide a method of manufacturing an outer joint member and an outer joint member, which are capable of increasing strength, quality, and reliability of the welded portion, reducing welding cost, enhancing productivity of the shaft member, reducing the manufacturing cost, and achieving reduction of cost and reduction of a burden of production management through standardization of a product type.

Solution to the Problems

In order to achieve the above-mentioned object, the inventors of the present invention have diligently conducted research and verification to arrive at the following findings. Based on the findings from multiple aspects, the inventors of the present invention have conceived a novel manufacturing concept in consideration of mass-productivity to achieve the present invention.

(1) In terms of production technology, when the cup member and the shaft member are welded to each other under a state in which the cup member and the shaft member are placed in a sealed space and the hollow cavity portion as well as the sealed space is evacuated, blowing of a molten material and generation of air bubbles are suppressed.

(2) Further, in terms of productivity, when welding is performed on the cup member and the shaft member after being subjected to heat treatment such as quenching and tempering in order to enhance productivity, a temperature of a peripheral portion is increased by heat generated during the welding, which causes a risk of reduction in hardness of a heat-treated portion. To address this problem, the inventors of the present invention have focused on a joining method involving steps capable of achieving highest efficiency and greatest cost reduction without affecting the joint function through change in the order of the welding step. For example, the following steps are adopted. In a case of a cup member and a shaft member having no risk of thermal effect during the welding, the cup member and the shaft member in a finished state after being subjected to heat treatment that involves quenching and tempering are welded to each other. In a case of a cup member and a shaft member having a risk of thermal effect, on the other hand, the cup member and the shaft member are subjected to heat treatment after the welding. As in this example, the inventors of the present invention have found a concept of adopting optimum steps depending on shapes, specifications, and the like of the cup member and the shaft member.

(3) Still further, in terms of productivity and standardization of the product type, the inventors of the present invention have found the following problem with the cup member 72 illustrated in FIG. 19 to FIG. 21. That is, the cup member 72 has a short shaft section formed by forging or the like to have a diameter smaller than that of the bottom portion of the cup section. Hitherto, this short shaft section is prepared based on the shape and dimensions of the shaft member 73, and is joined to the shaft member 73 at an intermediate position on the entire shaft section. Depending on a vehicle to which the shaft member 73 is assembled, the shaft member 73 is required to have a variety of shaft diameters and outer peripheral shapes in addition to differences in types such as a general length stem type and a long stem type. Therefore, when the short shaft section of the cup member 72 is prepared based on the shape and dimensions of the shaft member 73, and is joined to the shaft member 73 at the intermediate position on the entire shaft section, a cup member 72 dedicated to one type of the shaft member 73 is required due to differences both in shaft diameter (joining diameter) and in shape and length (joining position) of the short shaft section of the cup member 72 to be joined to the shaft member 73. Therefore, it was found that there is a problem also in terms of cost reduction achieved through enhancement of productivity and standardization of a product type of the cup member.

(4) As another item, the inventors of the present invention have found the following problem in a process of pursuing the quality and reliability of the welded portion of the electron beam welding in terms of production technology. FIG. 4 are each an illustration of findings in the course of development. The inventors of the present invention have verified a welding state when welding is performed with an electron beam under a state in which cylindrical joining end portions are held in abutment against each other and a welding state when welding is performed with an electron beam under a state in which a columnar joining end portion and a cylindrical joining end portion as illustrated in FIG. 4a are held in abutment against each other. As a result, it was found that, when an outer diameter B' of a joining end surface 50' of a cup member 12a' and an outer diameter B' of a joining end surface 51' of a shaft member 13a' are set to an equal dimension, a molten portion sinks inside, and an outer diameter I of a welded portion 49' becomes smaller than the outer diameter B' of the cup member 12a' and the shaft member 13a' to cause shrinkage G, as illustrated in FIG. 4b depending on the welding condition. When the shrinkage G occurs, there is a risk of decrease in strength of welding due to the cutaway effect of a recessed portion and the reduction in joining area. Therefore, the inventors of the present invention have focused on the fact that it is necessary to take measures in consideration of the condition of the constant velocity universal joint being a mass-produced product for automobiles and the like.

As a technical measure to achieve the above-mentioned object, according to one embodiment of the present invention, there is provided a method of manufacturing an outer joint member of a constant velocity universal joint, the outer joint member being constructed by forming, through use of separate members, a cup section having track grooves formed at an inner periphery of the cup section and engageable with torque transmitting elements, and a shaft section formed at a bottom portion of the cup section, and by welding a cup member forming the cup section and a shaft member forming the shaft section, the method comprising: forming the cup member and the shaft member of medium carbon steel; preparing, as the cup member, a cup member having a cylindrical portion and a bottom portion integrally formed by forging, and a joining end surface formed on an outer surface of the bottom portion in a machining step after the forging; preparing, as the shaft member, a shaft member having a joining end surface to be joined to the bottom portion of the cup member, which is formed in a machining step; bringing the joining end surface of the cup member and the joining end surface of the shaft member into abutment against each other; and welding the cup member and the shaft member by radiating a beam from an outer side of the cup member to an abutment portion between the cup member and the shaft member in a radial direction of the cup member, the joining end surface of the cup member and the joining end surface of the shaft member having a dimension difference between outer diameters thereof.

Further, according to one embodiment of the present invention for an outer joint member of a constant velocity universal joint, there is provided an outer joint member of a constant velocity universal joint, comprising: a cup section having track grooves formed at an inner periphery of the cup section and engageable with torque transmitting elements; and a shaft section formed at a bottom portion of the cup section, the outer joint member being constructed by forming the cup section and the shaft section through use of separate members, and by welding a cup member forming the cup section and a shaft member forming the shaft section, the cup member and the shaft member being formed of medium carbon steel, the cup member having a cylindrical portion and a bottom portion integrally formed by forging, and a joining end surface formed on an outer surface of the bottom portion, the shaft member having a joining end surface formed at an end portion of the shaft member to be joined to the bottom portion of the cup member, the cup member and the shaft member being welded to each other under a state in which the joining end surface of the cup member and the joining end surface of the shaft member are held in abutment against each other, the outer joint member comprising a welded portion between the cup member and the shaft member, which is formed of a bead formed by a beam radiated in a radial direction of the cup member from an outer side of the cup member, the joining end surface of the cup member and the joining end surface of the shaft member having a dimension difference between outer diameters thereof, the welded portion having an outer diameter without recess.

With the above-mentioned configuration, it is possible to achieve the method of manufacturing an outer joint member and the outer joint member, which are capable of increasing strength, quality, and reliability of the welded portion, reducing welding cost, enhancing productivity, reducing the manufacturing cost, and achieving reduction of cost and reduction of a burden of production management through standardization of a product type. In particular, in terms of the strength, quality, and reliability of the welded portion, as the shape of the welded portion, the joining end surface of the cup member and the joining end surface of the shaft member have a dimension difference between outer diameters thereof. Therefore, the shrinkage of the welded portion is suppressed. With this, the problems of the cutaway effect of the welded portion and the reduction in joining area can be avoided, and the decrease in strength of welding can be prevented, thereby increasing the quality and reliability of the welded portion.

Specifically, when the outer diameter of the joining end surface of the cup member is set to an equal dimension for each joint size, a degree of processing for the cup member to be standardized in product type can be increased. As a result, the enhancement of productivity and the reduction of the burden of production management can be further promoted.

In this case, in Claims and Specification of the present application, setting the outer diameter of the joining end surface of the cup member to an equal dimension for each joint size is not limited to preparing one type of the cup member for one joint size, that is, not limited to preparing the cup member assigned with a single product number. For example, the present invention encompasses preparing cup members of a plurality of types (assigned with a plurality of product numbers, respectively) for one joint size based on different specifications of a maximum operating angle, and setting the outer diameter of the joining end surface of each of the cup members to an equal dimension. In addition, the present invention encompasses, for example, preparing cup members of a plurality of types (assigned with a plurality of product numbers, respectively) for one joint size in order to achieve management of the cup members in a plurality of forms including intermediate components before heat treatment and finished components after heat treatment in consideration of the joint function, the circumstances at the manufacturing site, the productivity, and the like, and setting the outer diameter of the joining end surface of each of the cup members to an equal dimension.

Further, in Claims and Specification of the present application, setting the outer diameter of the joining end surface of the cup member to an equal dimension for each joint size may be applied also to different types of constant velocity universal joints. For example, the present invention encompasses setting outer diameters of the joining end surfaces of a tripod type constant velocity universal joint and a double-offset constant velocity universal joint to equal dimensions on the inboard side, and encompasses setting outer diameters of the joining end surfaces of a Rzeppa type constant velocity universal joint and an undercut-free type constant velocity universal joint to equal dimensions on the outboard side. Further, the present invention also encompasses setting the outer diameters of the joining end surfaces of the constant velocity universal joints on the inboard side and the outboard side to equal dimensions on the inboard side and the outboard side.

It is preferred that the outer diameter of the joining end surface of the cup member be set to be larger than the outer diameter of the joining end surface of the shaft member. With this, a weld configuration is obtained in which the cup member is connected to the shaft member gradually without recess from the outer diameter of the joining end surface of the cup member to the outer diameter of the joining end surface of the shaft member. Thus, the problems of the cutaway effect and the reduction in joining area can be avoided, thereby securing the strength of welding. In particular, the weld configuration in which the diameter is gradually reduced from the outer diameter of the joining end surface of the cup member to the outer diameter of the joining end surface of the shaft member is more efficient in consideration of the shape of the outer joint member.

Effects of the Invention

According to the method of manufacturing an outer joint member of a constant velocity universal joint and the outer joint member of the present invention, it is possible to achieve the method of manufacturing an outer joint member and the outer joint member, which are capable of increasing the strength, quality, and reliability of the welded portion, reducing the welding cost, enhancing productivity, reducing the manufacturing cost, achieving the reduction of cost and reduction of the burden of production management through the standardization of a product type. In particular, in terms of the strength, quality, and reliability of the welded portion, as the shape of the welded portion, the joining end surface of the cup member and the joining end surface of the shaft member have a dimension difference between outer diameters thereof. Therefore, the shrinkage of the welded portion is suppressed. Thus, the problems of the cutaway effect of the welded portion and the reduction in joining area can be avoided, and the decrease in strength of welding can be prevented, thereby increasing the quality and reliability of the welded portion.

BRIEF DESCRIPTION OF DRAWINGS

FIG. 2b is an enlarged view for illustrating a portion "A" of FIG. 2a.

EMBODIMENTS OF THE INVENTION

Now, description is made of embodiments of the present invention with reference to the drawings.

Figure 1:
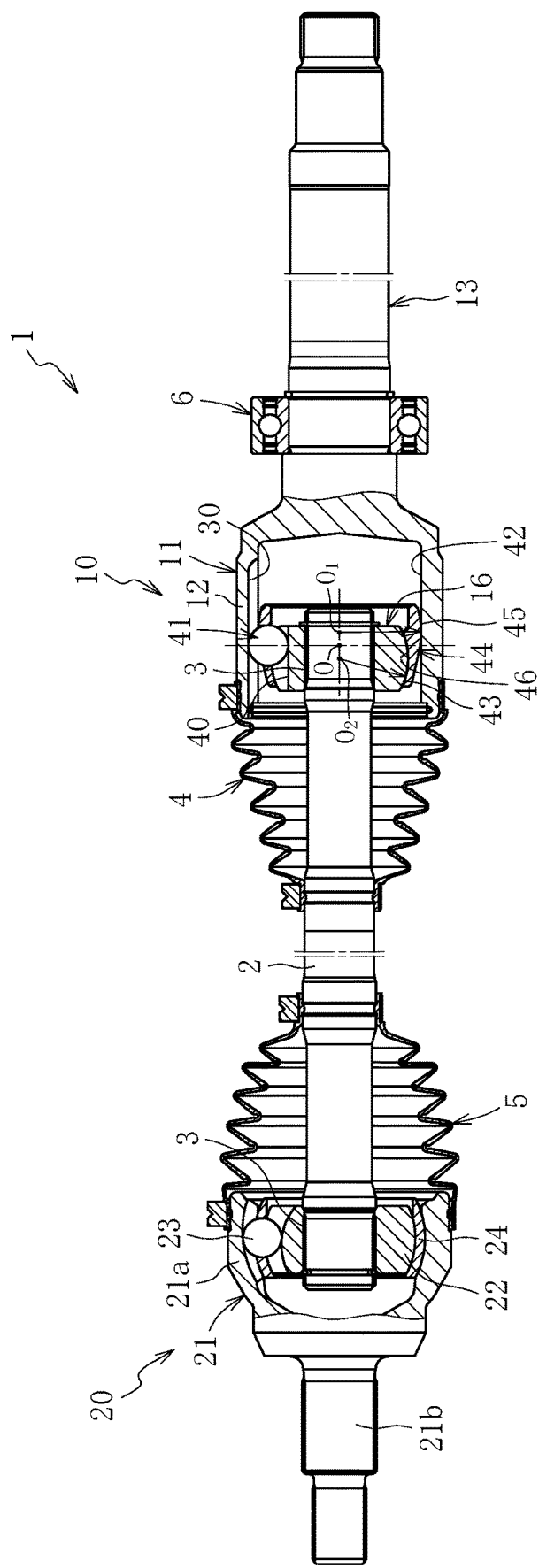
FIG. 1 is a view for illustrating the entire structure of a drive shaft to which an outer joint member according to a first embodiment of the present invention is applied.

FIG. 5 to FIG. 12 are illustrations of a method of manufacturing an outer joint member of a constant velocity universal joint according to a first embodiment of the present invention, and FIG. 1 to FIG. 3 are illustrations of an outer joint member according to the first embodiment of the present invention. First, the outer joint member according to the first embodiment is described with reference to FIG. 1 to FIG. 3, and subsequently, the method of manufacturing an outer joint member according to the first embodiment is described with reference to FIG. 5 to FIG. 12.

FIG. 1 is a view for illustrating the entire structure of a drive shaft 1 using an outer joint member 11 according to the first embodiment. The drive shaft 1 mainly comprises a plunging type constant velocity universal joint 10 arranged on a differential side (right side of FIG. 1: hereinafter also referred to as "inboard side"), a fixed type constant velocity universal joint 20 arranged on a driving wheel side (left side of FIG. 1: hereinafter also referred to as "outboard side"), and an intermediate shaft 2 configured to couple both the constant velocity universal joints 10 and 20 to allow torque transmission therebetween.

The plunging type constant velocity universal joint 10 illustrated in FIG. 1 is a so-called double-offset type constant velocity universal joint (DOJ). The constant velocity universal joint 10 comprises the outer joint member 11 comprising a cup section 12 and a long shaft section (hereinafter referred to also as "long stem section") 13 that extends from a bottom portion of the cup section 12 in an axial direction, an inner joint member 16 housed along an inner periphery of the cup section 12 of the outer joint member 11, balls 41 serving as torque transmitting elements that are arranged between track grooves 30 and 40 of the outer joint member 11 and the inner joint member 16, and a cage 44 having a spherical outer peripheral surface 45 and a spherical inner peripheral surface 46 that are fitted to a cylindrical inner peripheral surface 42 of the outer joint member 11 and a spherical outer peripheral surface 43 of the inner joint member 16, respectively, and being configured to retain the balls 41. A curvature center $O_1$ of the spherical outer peripheral surface 45 and a curvature center $O_2$ of the spherical inner peripheral surface 46 of the cage 44 are offset equidistantly from a joint center O toward opposite sides in the axial direction.

An inner ring of a support bearing 6 is fixed to an outer peripheral surface of the long stem section 13, and an outer ring of the support bearing 6 is fixed to a transmission case with a bracket (not shown). The outer joint member 11 is supported by the support bearing 6 in a freely rotatable manner, and when the support bearing 6 as described above is provided, vibration of the outer joint member 11 during driving or the like is prevented as much as possible.

The fixed type constant velocity universal joint 20 illustrated in FIG. 1 is a so-called Rzeppa type constant velocity universal joint, and comprises an outer joint member 21 comprising a bottomed cylindrical cup section 21a and a shaft section 21b that extends from a bottom portion of the cup section 21a in the axial direction, an inner joint member 22 housed along an inner periphery of the cup section 21a of the outer joint member 21, balls 23 serving as torque transmitting elements that are arranged between the cup section 21a of the outer joint member 21 and the inner joint member 22, and a cage 24, which is arranged between an inner peripheral surface of the cup section 21a of the outer joint member 21 and an outer peripheral surface of the inner joint member 22, and is configured to retain the balls 23. As the fixed type constant velocity universal joint 20, an undercut-free type constant velocity universal joint may sometimes be used.

The intermediate shaft 2 comprises splines 3 for torque transmission (including serrations; the same applies hereinafter) at outer diameter portions on both end portions thereof. The spline 3 on the inboard side is spline-fitted to a hole portion of the inner joint member 16 of the plunging type constant velocity universal joint 10. Thus, the intermediate shaft 2 and the inner joint member 16 of the plunging type constant velocity universal joint 10 are coupled to each other to allow torque transmission therebetween. Further, the spline 3 on the outboard side is spline-fitted to a hole portion of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the solid intermediate shaft 2 is illustrated, a hollow intermediate shaft may be used instead.

Grease is sealed inside both the constant velocity universal joints 10 and 20 as a lubricant. To prevent leakage of the grease to an outside of the joint or entry of a foreign matter from the outside of the joint, bellows boots 4 and 5 are respectively mounted to a portion between the outer joint member 11 of the plunging type constant velocity universal joint 10 and the intermediate shaft 2 and a portion between the outer joint member 21 of the fixed type constant velocity universal joint 20 and the intermediate shaft 2.

Figure 2C:
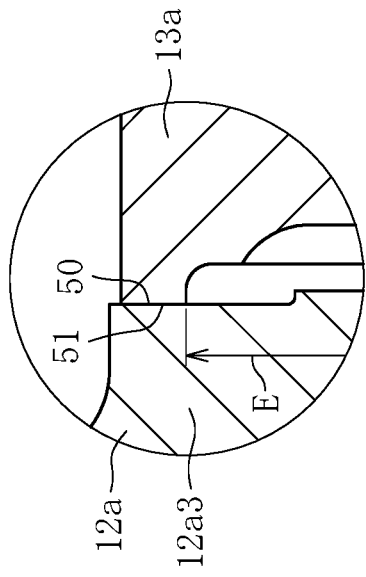
FIG. 2c is a view for illustrating a state of FIG. 2b before welding.
Figure 2B:
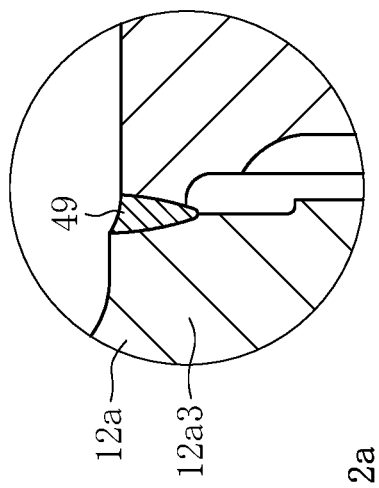
Figure 2A:
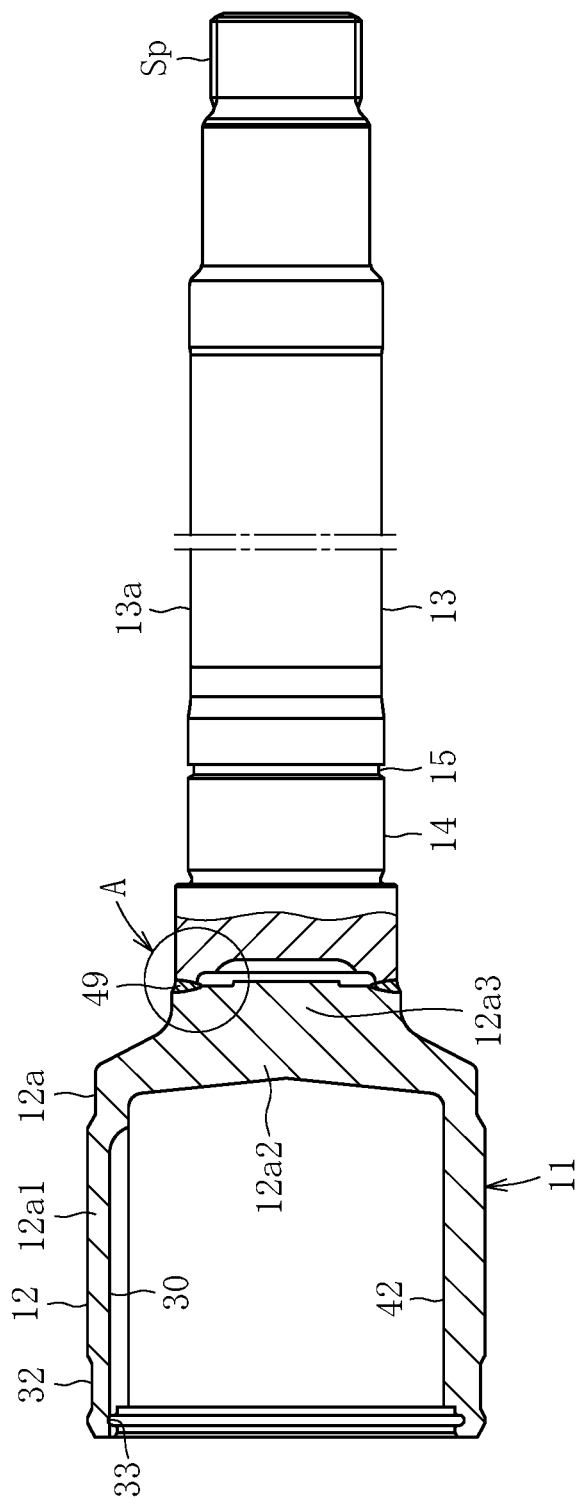
FIG. 2a is an enlarged partial vertical sectional view for illustrating the outer joint member of FIG. 1.

The outer joint member according to the first embodiment is described with reference to FIG. 2. FIG. 2 are enlarged views for illustrating the outer joint member 11 according to this embodiment. FIG. 2a is a partial vertical sectional view. FIG. 2b is an enlarged view for illustrating a portion "A" of FIG. 2a. FIG. 2c is a view for illustrating a shape before welding. The outer joint member 11 comprises the bottomed cylindrical cup section 12 that is opened at one end and has the cylindrical inner peripheral surface 42 and the plurality of track grooves 30, on which the balls 41 (see FIG. 1) are caused to roll, formed equiangularly on the inner peripheral surface, and the long stem section 13 that extends from the bottom portion of the cup section 12 in the axial direction and comprises a spline Sp serving as a torque transmitting coupling portion formed at an outer periphery on an end portion thereof on an opposite side to the cup section 12. In this embodiment, the outer joint member 11 is formed by welding a cup member 12a and a shaft member 13a to each other.

The cup member 12a illustrated in FIG. 2a to FIG. 2c is an integrally-formed product being made of medium carbon steel, such as S53C, containing carbon of from 0.40 wt % to 0.60 wt %, and having a cylindrical portion 12a1 and a bottom portion 12a2. The cylindrical portion 12a1 has the track grooves 30 and the cylindrical inner peripheral surface 42 formed at an inner periphery thereof. A projecting portion 12a3 is formed at the bottom portion 12a2 of the cup member 12a. A boot mounting groove 32 is formed at an outer periphery of the cup member 12a on the opening side thereof, whereas a snap ring groove 33 is formed at an inner periphery of the cup member 12a on the opening side thereof. A bearing mounting surface 14 and a snap ring groove 15 are formed at an outer periphery of the shaft member 13a on the cup member 12a side, whereas the spline Sp is formed at an end portion of the shaft member 13a on an opposite side.

The shaft member 13a is made of medium carbon steel, such as S40C, containing carbon of from 0.30 wt % to 0.55 wt %. A joining end surface 50 formed at the projecting portion 12a3 of the bottom portion 12a2 of the cup member 12a and a joining end surface 51 formed at an end portion of the shaft member 13a on the cup member 12a side are brought into abutment against each other, and are welded to each other by electron beam welding performed from an outer side of the cup member 12a in a radial direction. As illustrated in FIG. 2a and FIG. 2b, a welded portion 49 is formed of a bead, which is formed by a beam radiated from a radially outer side of the cup member 12a.

Figure 3A:
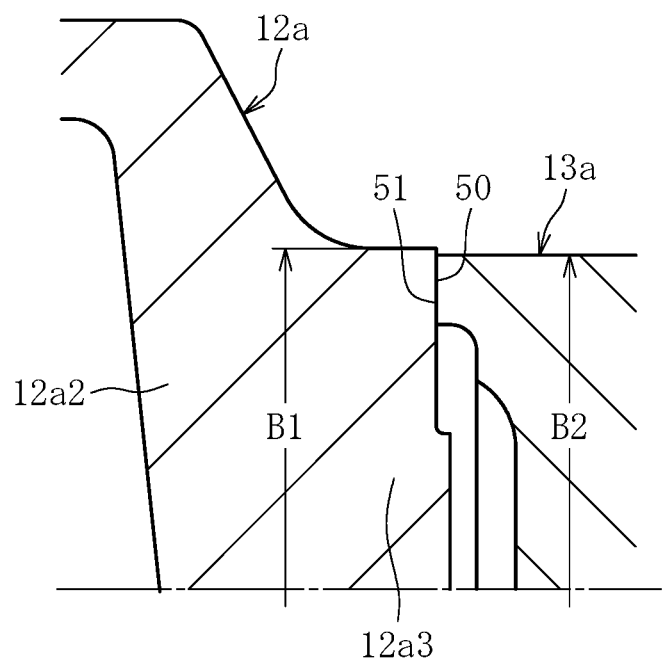
FIG. 3a is a vertical sectional view for illustrating a dimensional relationship of an outer diameter of a joining end surface of FIG. 2a and a state before welding.
Figure 3B:
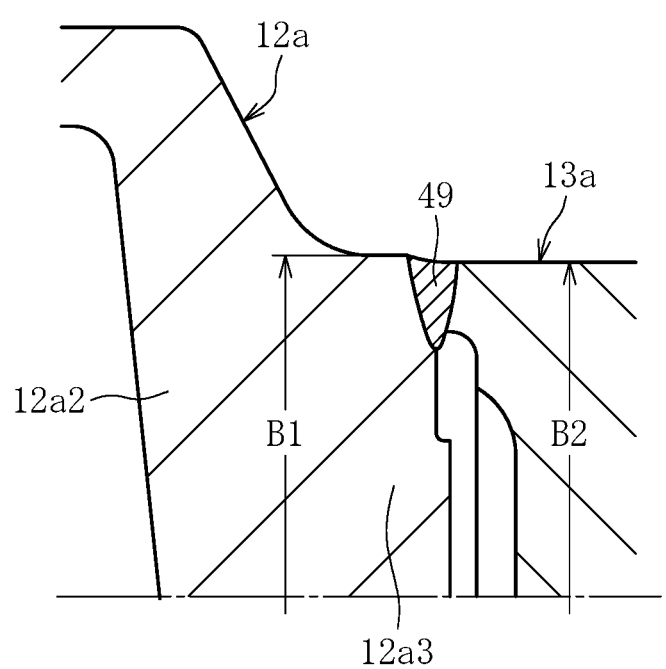
FIG. 3b is a vertical sectional view for illustrating a dimensional relationship of the outer diameter of the joining end surface of FIG. 2a and a state after welding.

Features of the outer joint member 11 of this embodiment are described based on FIG. 3. FIG. 3 are each an enlarged illustration of an upper portion in a radial direction in the vicinity of the welded portion of FIG. 2. FIG. 3a is a vertical sectional view for illustrating a state before welding, and FIG. 3b is a vertical sectional view for illustrating a state after welding.

As illustrated in FIG. 3a, in the outer joint member 11 of this embodiment, an outer diameter B1 of the joining end surface 50 formed on the projecting portion 12a3 of the bottom portion 12a2 of the cup member 12a is set to be slightly larger than an outer diameter B2 of the joining end surface 51 of the shaft member 13a. A dimension difference between the outer diameter B1 and the outer diameter B2 slightly varies depending on a joint size, but is from about 0.5 mm to about 2 mm.

When the above-mentioned dimension difference is provided, shrinkage of the welded portion 49 welded with an electron beam described later is suppressed, and as illustrated in FIG. 3b, a weld configuration is obtained in which the cup member 12a is connected to the shaft member 13a gradually without recess from the outer diameter B1 portion of the joining end surface 50 of the cup member 12a to the outer diameter B2 portion of the joining end surface 51 of the shaft member 13a. The reason for this is considered as follows. During the welding, the amount of a metal to be melted of the outer diameter B1 portion on a larger side increases to suppress shrinkage. With this, the problems of the cutaway effect of the welded portion and the reduction in joining area can be avoided, and the decrease in strength of welding can be prevented. In particular, the weld configuration in which the diameter is gradually reduced from the outer diameter of the joining end surface of the cup member to the outer diameter of the joining end surface of the shaft member is more efficient in consideration of the shape of the outer joint member.

Figure 4A:
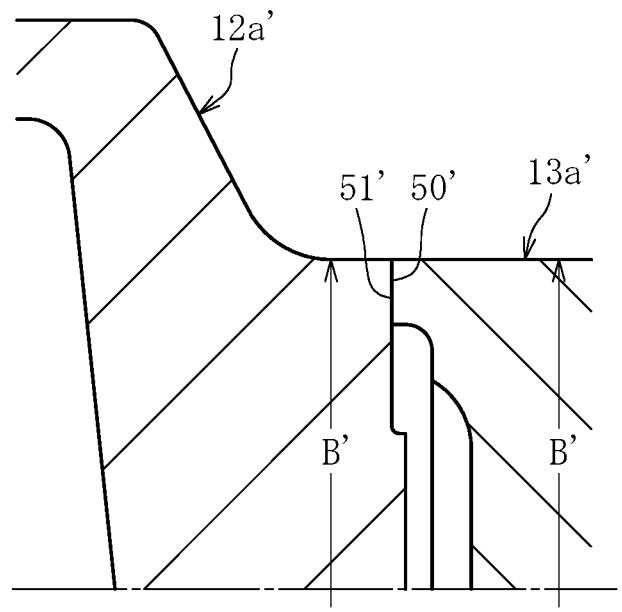
FIG. 4a is a partial vertical sectional view for illustrating findings in the course of development and a state before welding.
Figure 4B:
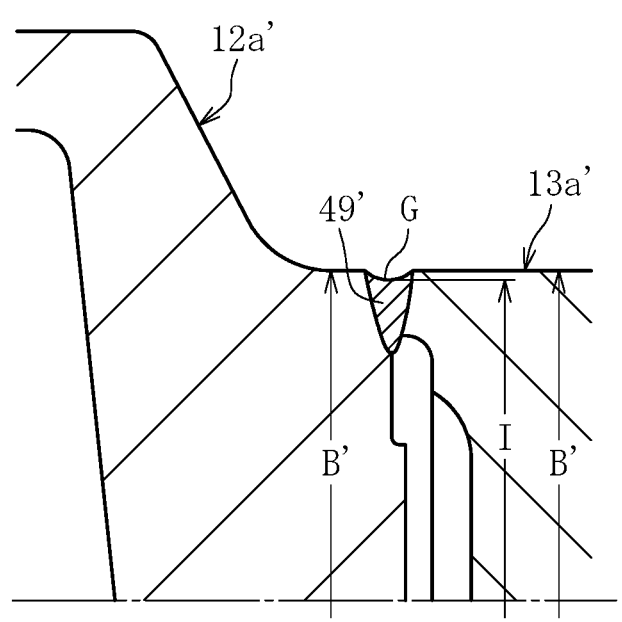
FIG. 4b is a partial vertical sectional view for illustrating the findings in the course of development and a state after welding.

In order to facilitate the understanding of the above-mentioned feature, the findings verified in the course of development are additionally described. It was found that, when the outer diameter B' of the joining end surface 50' of the cup member 12a' and the outer diameter B' of the joining end surface 51' of the shaft member 13a' are set to an equal dimension as illustrated in FIG. 4a, the molten portion sinks inside, and the outer diameter I of the welded portion 49' becomes smaller than the outer diameter B' of the cup member 12a' and the shaft member 13a' to cause shrinkage G, as illustrated in FIG. 4b depending on the welding condition.

As illustrated in FIG. 2a, in the outer joint member 11 of this embodiment, the welded portion 49 is formed on the joining end surface 51 located on the cup member 12a side with respect to the bearing mounting surface 14 of the shaft member 13a, and hence the bearing mounting surface 14 and the like can be processed in advance so that post-processing after welding can be omitted. Further, due to the electron beam welding, burrs are not generated at the welded portion. Thus, post-processing for the welded portion can also be omitted, which can reduce manufacturing cost. Still further, total inspection on the welded portion through ultrasonic flaw detection can be performed.

As illustrated in FIG. 2c, the joining end surface 50 of the cup member 12a is formed by annular turning, and a center portion in a radial direction maintains a forged surface. With this, a turning time is shortened.

Figure 5:
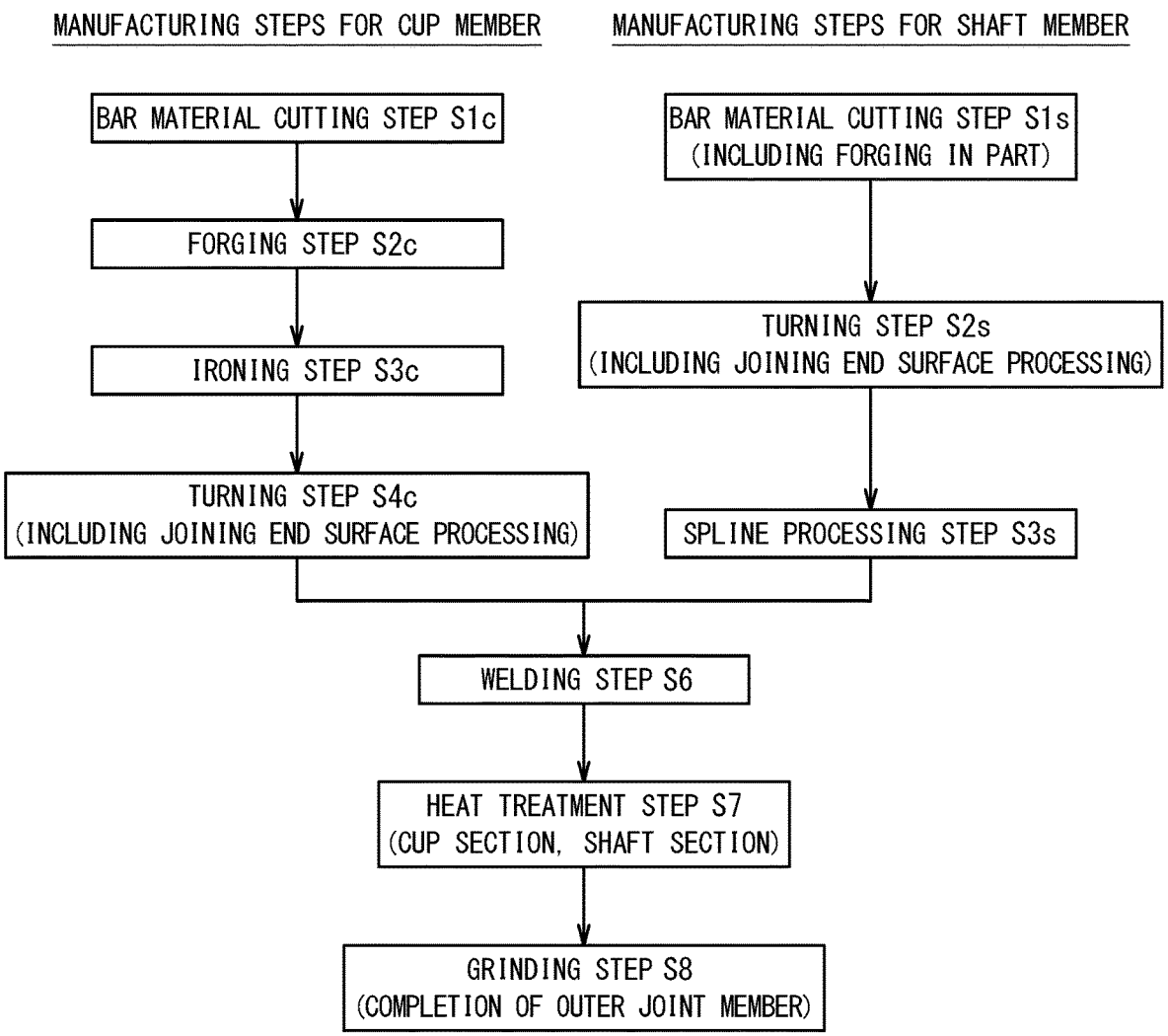
FIG. 5 is a view for illustrating a method of manufacturing an outer joint member according to a first embodiment of the present invention and an overview of manufacturing steps for the outer joint member of FIG. 1.

Next, the manufacturing method according to the first embodiment of the present invention is described with reference to FIG. 5 to FIG. 12. An overview of manufacturing steps (processing steps) of the manufacturing method of this embodiment is described. FIG. 5 is an illustration of the overview of the manufacturing steps for the outer joint member. In this embodiment, as illustrated in FIG. 5, the cup member 12a is manufactured through manufacturing steps comprising a bar material cutting step S1c, a forging step S2c, an ironing step S3c, and a turning step S4c. Meanwhile, the shaft member 13a is manufactured through manufacturing steps comprising a bar material cutting step S1s, a turning step S2s, and a turning step S3s. Intermediate components of the cup member 12a and the shaft member 13a thus manufactured are each assigned with a product number for management.

After that, the cup member 12a and the shaft member 13a are subjected to a welding step S6, a heat treatment step S7, and a grinding step S8 so that the outer joint member 11 is completed. A machining step described in Claims refers to the turning step S4c and the turning step S2s among the above-mentioned manufacturing steps, and to a grinding step S5s described later (see FIG. 15).

An overview of each step is described. Each step is described as a typical example, and appropriate modification and addition may be made to each step as needed. First, the manufacturing steps for the cup member 12a are described.

[Bar Material Cutting Step S1c]

A bar material is cut into a predetermined length in accordance with a forging weight, thereby producing a billet.

[Forging Step S2c]

The billet is subjected to forging so as to integrally form the cylindrical portion, the bottom portion, and the projecting portion as a preform of the cup member 12a.

[Ironing Step S3c]

Ironing is performed on the track grooves 30 and the cylindrical inner peripheral surface 42 of the preform, thereby finishing the inner periphery of the cylindrical portion of the cup member 12a.

[Turning Step S4c]

In the preform after ironing, the outer peripheral surface, the boot mounting groove 32, the snap ring groove 33, and the like, and the joining end surface 50 are formed by turning. In this embodiment, after the turning step S4c, the cup member 12a in the form of an intermediate component is assigned with a product number for management.

Next, the manufacturing steps for the shaft member 13a are described. [Bar Material Cutting Step S1s]

A bar material is cut into a predetermined length in accordance with the entire length of the shaft section, thereby producing a billet. After that, the billet is forged into a rough shape by upset forging depending on the shape of the shaft member 13a.

[Turning Step S2s]

The outer peripheral surface of the billet or the forged preform (bearing mounting surface 14, snap ring groove 15, minor diameter of the spline, end surface, and the like) and the joining end surface 51 at the end portion on the cup member 12a side are formed by turning.

[Spline Processing Step S3s]

The spline is formed by rolling in the shaft member after turning. Note that, the method of forming the spline is not limited to the rolling, and press working or the like may be adopted instead as appropriate. In this embodiment, after the spline processing, the shaft member 13a in the form of an intermediate component is assigned with a product number for management.

Next, the manufacturing steps in the process of completing the outer joint member 11 from the cup member 12a and the shaft member 13a are described.

[Welding Step S6]

The joining end surface 50 of the cup member 12a and the joining end surface 51 of the shaft member 13a are brought into abutment against each other and welded. After the welding, the welded portion 49 between the cup member 12a and the shaft member 13a is inspected by the ultrasonic flaw-detection method.

[Heat Treatment Step S7]

Induction quenching and tempering are performed as heat treatment on at least the track grooves 30 and the cylindrical inner peripheral surface 42 of the cup section 12 after welding and a necessary range of the outer periphery of the shaft section 13 after welding. Heat treatment is not performed on the welded portion. A hardened layer having a hardness of approximately from 58 HRC to 64 HRC is formed on each of the track grooves 30 and the cylindrical inner peripheral surface 42 of the cup section 12. Further, a hardened layer having a hardness of approximately from 50 HRC to 63 HRC is formed in a predetermined range of the outer periphery of the shaft section 13.

[Grinding Step S8]

After the heat treatment, the bearing mounting surface 14 of the shaft section 13 and the like are finished by grinding. Thus, the outer joint member 11 is completed.

In the manufacturing steps of this embodiment, the heat treatment step is provided after the welding step, and hence the manufacturing steps are suited to a cup member and a shaft member having such shapes and specifications that the hardness of the heat-treated portion may be affected by temperature rise at the periphery due to heat generated during the welding.

Figure 6A:
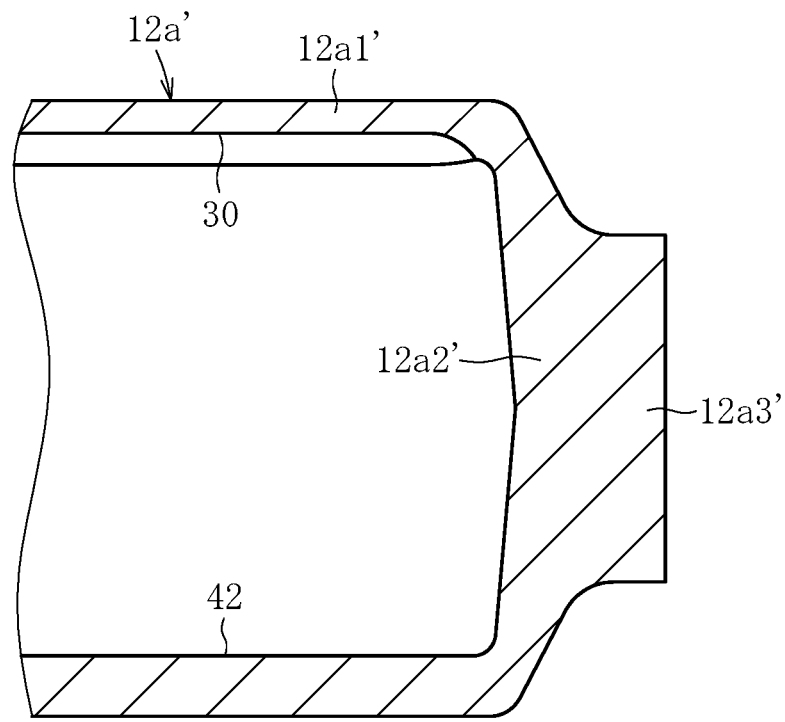
FIG. 6a is a vertical sectional view for illustrating a cup member before welding and after ironing.
Figure 6B:
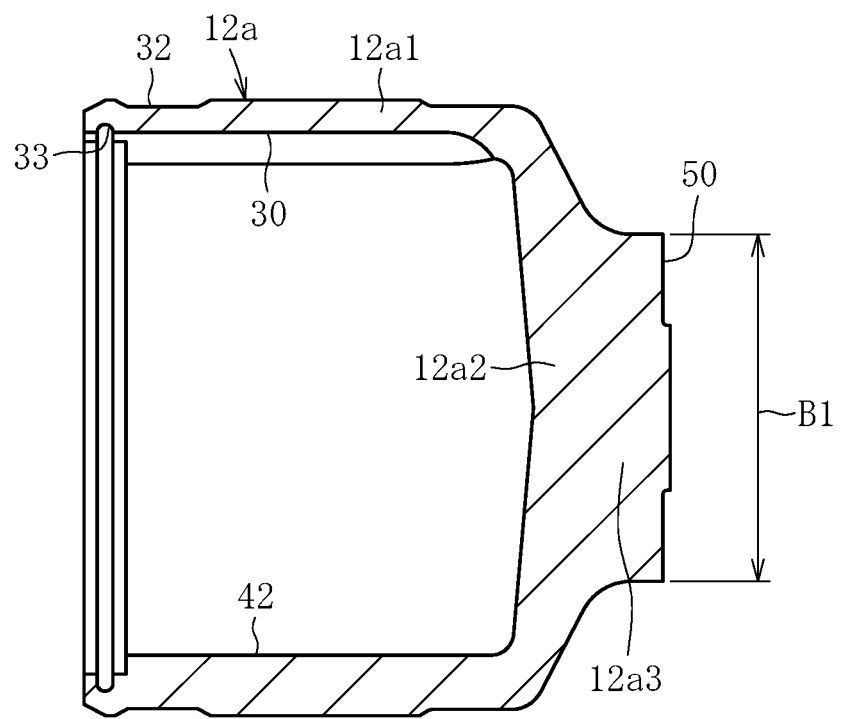
FIG. 6b is a vertical sectional view for illustrating the cup member before welding and after turning.

Next, main constituent features of the manufacturing method of this embodiment are described in detail. FIG. 6a is a vertical sectional view for illustrating a state after ironing of the cup member 12a. FIG. 6b is a vertical sectional view for illustrating a state after turning. In a preform 12a' for the cup member 12a, a cylindrical portion 12a1', a bottom portion 12a2', and a projecting portion 12a3' are integrally formed in the forging step S2c. After that, the track grooves 30 and the cylindrical inner peripheral surface 42 are formed by ironing in the ironing step S3c so that the inner periphery of the cylindrical portion 12a1' is finished as illustrated in FIG. 6a.

After that, in the turning step S4c, the outer peripheral surface, the boot mounting groove 32, the snap ring groove 33, and the like of the cup member 12a as well as the joining end surface 50 of the projecting portion 12a3 of the bottom portion 12a2 and the outer diameter B1 are formed by turning as illustrated in FIG. 6b. The outer diameter B1 is processed to a dimension slightly larger than the outer diameter B2 portion of the joining end surface 51 of the shaft member 13a.

Figure 7A:
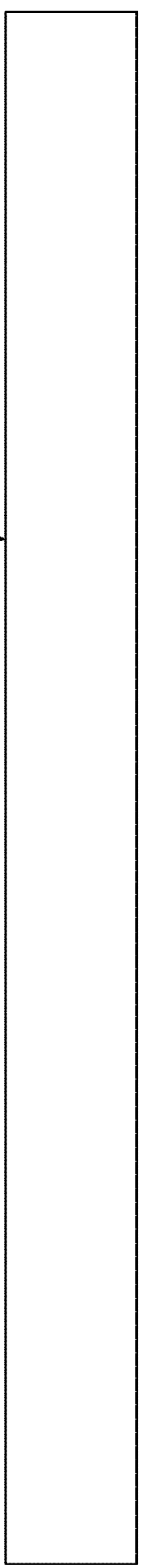
FIG. 7a is a front view of a billet cut from a bar material, for illustrating a shaft member before welding.
Figure 7B:
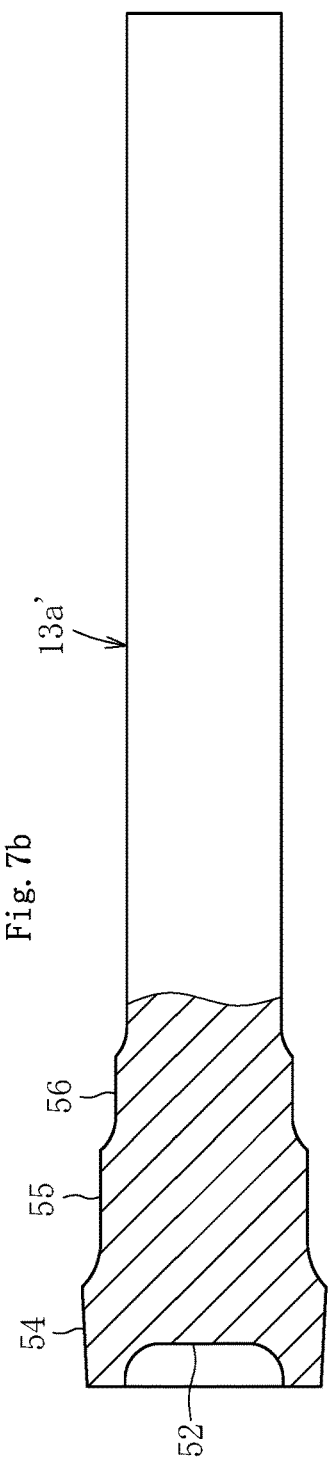
FIG. 7b is a partial vertical sectional view of the shaft member after forging, for illustrating the shaft member before welding.
Figure 7C:
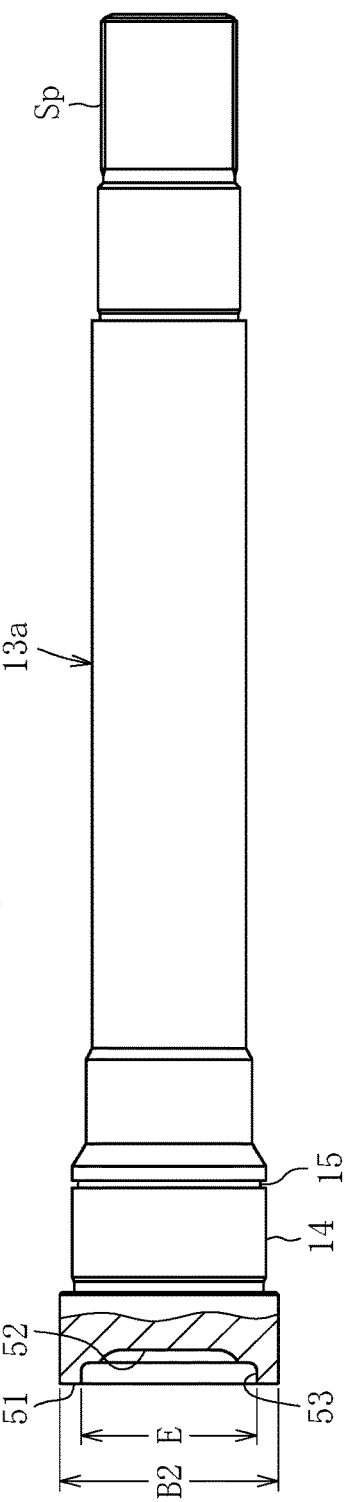
FIG. 7c is a partial vertical sectional view after turning and spline processing, for illustrating the shaft member before welding.

FIG. 7 are illustrations of states of the shaft member 13a in the respective processing steps. FIG. 7a is a front view for illustrating a billet 13a" obtained by cutting a bar material. FIG. 7b is a partial vertical sectional view for illustrating a preform 13a' obtained by forging the billet 13a" into a rough shape by the forging (upset forging). FIG. 7c is a partial vertical sectional view for illustrating the shaft member 13a after turning and spline processing.

When the billet 13a" illustrated in FIG. 7a is produced in the bar material cutting step S1s, and the billet 13a" is subjected to upset forging as illustrated in FIG. 7b, the preform 13a' is produced by increasing the shaft diameter of the billet 13a" in a predetermined range and forming a recessed portion 52 at a joining-side end portion (end portion on the cup member 12a side) while forming a step portion 54 in which the joining end surface 51 is formed, a second step portion 55 in which the bearing mounting surface 14 is formed, and a first step portion 56 by upset forging.

After that, in the turning step S2s, the outer diameter portion of the shaft member 13a, the bearing mounting surface 14, the snap ring groove 15, an inner diameter portion 53 (inner diameter E) of the recessed portion 52, the joining end surface 51, and the outer diameter B2 portion thereof are formed by turning as illustrated in FIG. 7c. In the spline processing step S3s, the spline Sp is processed at the end portion on the opposite side to the recessed portion 52 by rolling or press forming.

The outer diameter B1 of the joining end surface 50 of the cup member 12a illustrated in FIG. 6b is set to an equal dimension for one joint size. Further, in the shaft member 13a illustrated in FIG. 7c, which is used as a long stem shaft, the outer diameter B2 of the joining end surface 51 is set to a dimension slightly smaller than that of the outer diameter B1 of the joining end surface 50 of the cup member 12a, and the outer diameter B2 of the joining end surface 51 is set to an equal dimension for one joint size irrespective of the shaft diameter and the outer peripheral shape. Still further, the joining end surface 51 of the shaft member 13a is located at the position on the cup member 12a side with respect to the bearing mounting surface 14. Through the setting of dimensions as described above, the outer joint member 11 compatible with various vehicle types can be manufactured in such a manner that, while the cup member 12a is prepared for common use, only the shaft member 13a is manufactured to have a variety of shaft diameters, lengths, and outer peripheral shapes depending on vehicle types, and both the members 12a and 13a are welded to each other. Details of the preparation of the cup member 12a for common use are described later.

Figure 8:
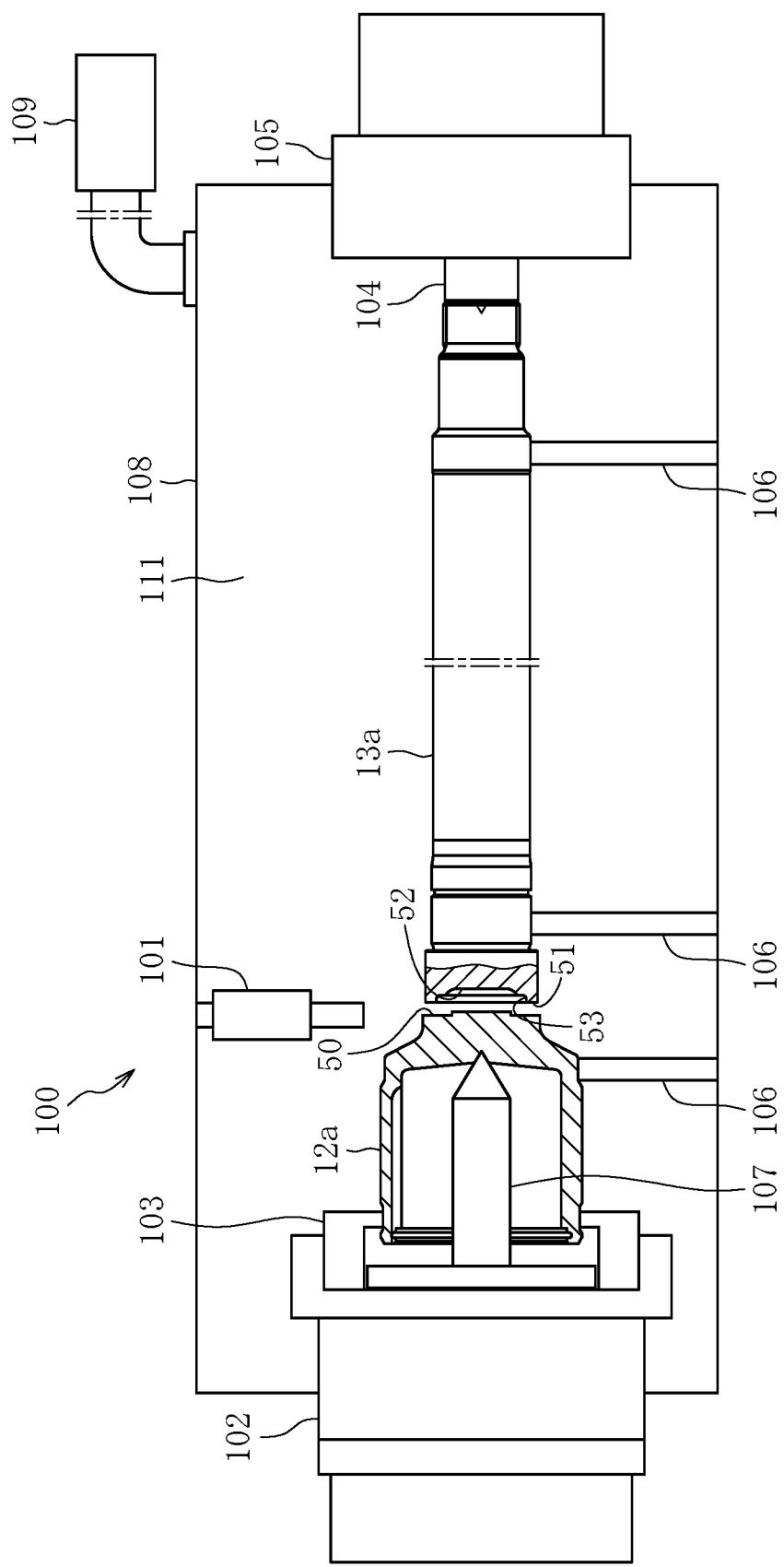
FIG. 8 is a view for illustrating an overview of a welding step.
Figure 9:
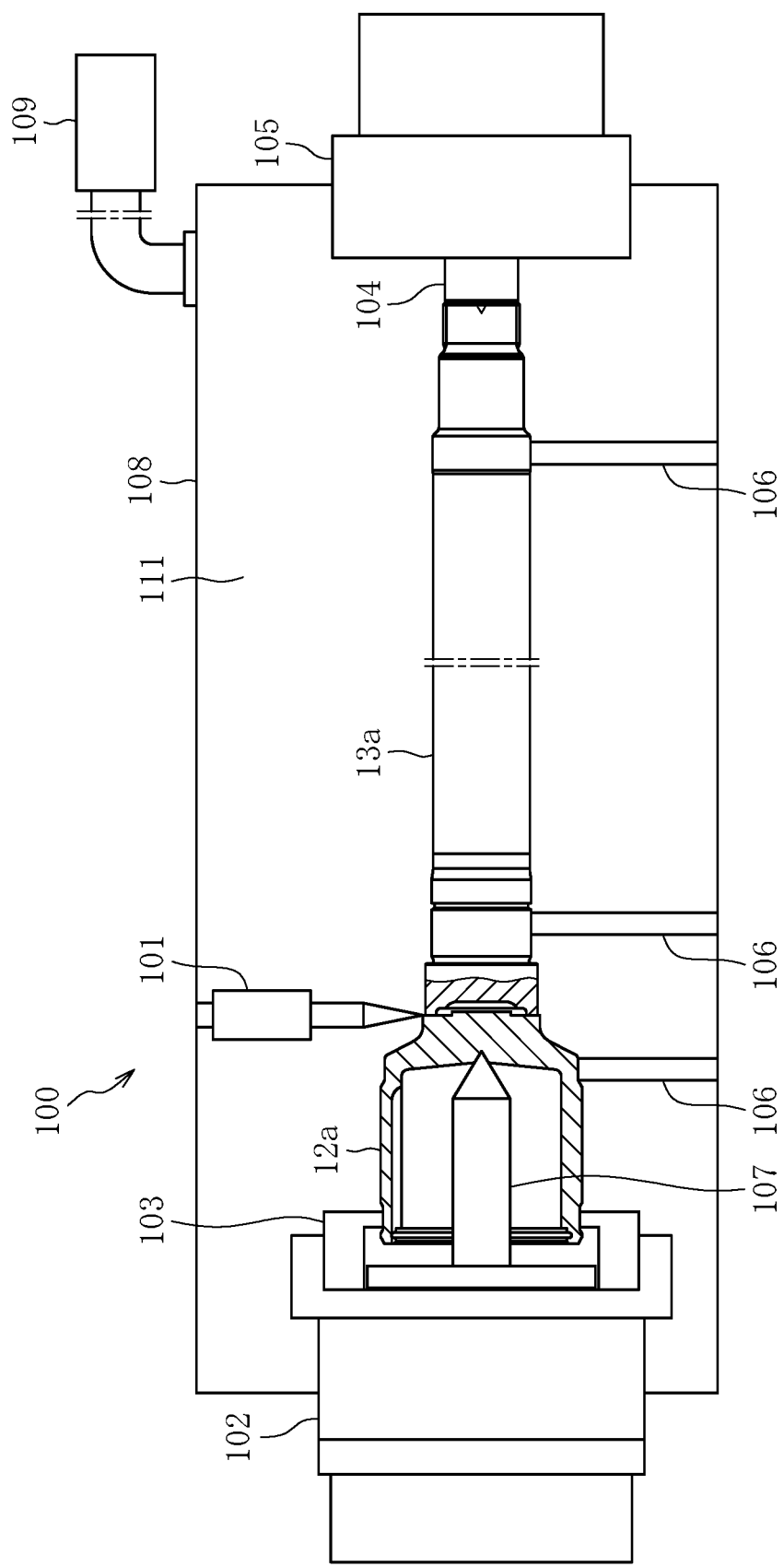
FIG. 9 is a view for illustrating an overview of the welding step.

Next, a method of welding the cup member 12a and the shaft member 13a is described with reference to FIG. 8 and FIG. 9. FIG. 8 and FIG. 9 are views for illustrating an overview of a welding apparatus. FIG. 8 is an illustration of a state before welding. FIG. 9 is an illustration of a state during welding. As illustrated in FIG. 8, a welding apparatus 100 mainly comprises an electron gun 101, a rotation device 102, a chuck 103, a center hole guide 104, a tailstock 105, workpiece supports 106, a center hole guide 107, a case 108, and a vacuum pump 109.

The cup member 12a and the shaft member 13a being workpieces are placed on the workpiece supports 106 arranged inside the welding apparatus 100. The chuck 103 and the center hole guide 107 arranged at one end of the welding apparatus 100 are coupled to the rotation device 102. The chuck 103 grips the cup member 12a to rotate the cup member 12a under a state in which the cup member 12a is centered by the center hole guide 107. The center hole guide 104 is integrally mounted to the tailstock 105 arranged at another end of the welding apparatus 100. Both the center hole guide 104 and the tailstock 105 are configured to reciprocate in the axial direction (lateral directions of FIG. 8 and FIG. 9).

A center hole of the shaft member 13a is set on the center hole guide 104 so that the shaft member 13a is centered. The vacuum pump 109 is connected to the case 108 of the welding apparatus 100. A "sealed space" herein refers to a space 111 defined by the case 108. In this embodiment, the cup member 12a and the shaft member 13a are entirely received in the sealed space 111. The electron gun 101 is arranged at a position corresponding to the joining end surfaces 50 and 51 of the cup member 12a and the shaft member 13a. The electron gun 101 is configured to approach the workpieces up to a predetermined position.

Next, the operation of the welding apparatus 100 constructed as described above and the welding method are described. The cup member 12a and the shaft member 13a being workpieces are stocked at a place different from the place of the welding apparatus 100. The respective workpieces are taken out by, for example, a robot, are conveyed into the case 108 of the welding apparatus 100 opened to the air as illustrated in FIG. 8, and are set at predetermined positions on the workpiece supports 106. At this time, the center hole guide 104 and the tailstock 105 are retreated to the right side of FIG. 8, and hence a gap is formed between the joining end surfaces 50 and 51 of the cup member 12a and the shaft member 13a. After that, a door (not shown) of the case 108 is closed, and the vacuum pump 109 is activated to reduce the pressure in the sealed space 111 defined in the case 108. Thus, the pressures in the recessed portion 52 and the inner diameter portion 53 of the shaft member 13a are reduced as well.

When the pressure in the sealed space 111 is reduced to a predetermined pressure, the center hole guide 104 and the tailstock 105 are advanced to the left side as illustrated in FIG. 9 to eliminate the gap between the joining end surfaces 50 and 51 of the cup member 12a and the shaft member 13a. Thus, the cup member 12a is centered by the center hole guide 107 and fixed by the chuck 103, whereas the shaft member 13*a* is supported by the center hole guide 104. After that, the workpiece supports 106 are moved away from the workpieces. At this time, the distance between the workpiece supports 106 and the workpieces may be infinitesimal, and hence illustration of this distance is omitted from FIG. 9.

As a matter of course, the welding apparatus 100 may have such a structure that the workpiece supports 106 are retreated downward greatly.

Although illustration is omitted, the electron gun 101 is then caused to approach the workpieces up to a predetermined position, and the workpieces are rotated to start pre-heating. As a pre-heating condition, unlike the welding condition, the temperature is set lower than the welding temperature by, for example, radiating an electron beam under a state in which the electron gun 101 is caused to approach the workpieces so as to increase the spot diameter. Through the pre-heating, the cooling rate after welding is reduced, thereby being capable of preventing a crack causing deformation. When a predetermined pre-heating time has elapsed, the electron gun 101 is retreated to a predetermined position, and radiates the electron beam from the outer side of the workpieces in the radial direction to start welding. When the welding is finished, the electron gun 101 is retreated, and the rotation of the workpieces is stopped.

Although illustration is omitted, the sealed space 111 is then opened to the air. Then, under a state in which the workpiece supports 106 are raised to support the workpieces, the center hole guide 104 and the tailstock 105 are retreated to the right side, and the chuck 103 is opened. After that, for example, the robot grips the workpieces, takes the workpieces out of the welding apparatus 100, and places the workpieces into alignment on a cooling stocker. In this embodiment, the cup member 12*a* and the shaft member 13*a* are entirely received in the sealed space 111, and hence the configuration of the sealed space 111 defined in the case 108 can be simplified.

Specifically, the cup member 12*a* having a carbon content of from 0.4% to 0.6% and the shaft member 13*a* having a carbon content of from 0.3% to 0.55% were used and welded to each other in the above-mentioned welding apparatus 100 under the condition that the pressure in the sealed space 111 defined in the case 108 was set to 6.7 Pa or less. In order to prevent the cup member 12*a* and the shaft member 13*a* from being cooled rapidly after the welding to suppress increase in hardness of the welded portion, the joining end surfaces 50 and 51 of the cup member 12*a* and the shaft member 13*a* were soaked by pre-heating to have a temperature of from 300° C. to 650° C., and then electron beam welding was performed. As a result, a welded portion having no shrinkage was obtained. Further, through the soaking by pre-heating, the hardness of the welded portion after completion of the welding was able to be kept within a range of from 200 Hv to 500 Hv, thereby being capable of attaining high welding strength and stable welding state and quality. Still further, the cup member 12*a* and the shaft member 13*a* were welded to each other under the condition that the pressure in the sealed space 111 of the welding apparatus 100 was set to an atmospheric pressure or less, thereby being capable of suppressing the change in pressure in the hollow cavity portion during the welding. As a result, the blowing of a molten material and the entry of the molten material toward the radially inner side were able to be prevented.

In the outer joint member 11 of this embodiment, as described above, the outer diameter B1 of the joining end surface 50 of the cup member 12*a* is formed to a dimension slightly larger than that of the outer diameter B2 of the joining end surface 51 of the shaft member 13*a*. Therefore, the shrinkage of the welded portion 49 welded with an electron beam described above is suppressed, and as illustrated in FIG. 3*b*, a weld configuration is obtained in which the cup member 12*a* is connected to the shaft member 13*a* gradually without recess from the outer diameter B1 of the joining end surface 50 of the cup member 12*a* to the outer diameter B2 of the joining end surface 51 of the shaft member 13*a*. The reason for this is considered as follows. During the welding, the amount of a metal to be melted of the outer diameter B1 on a larger side increases to suppress shrinkage. With this, the problems of the cutaway effect of the welded portion and the reduction in joining area can be avoided, and the decrease in strength of welding can be prevented.

Figure 10:
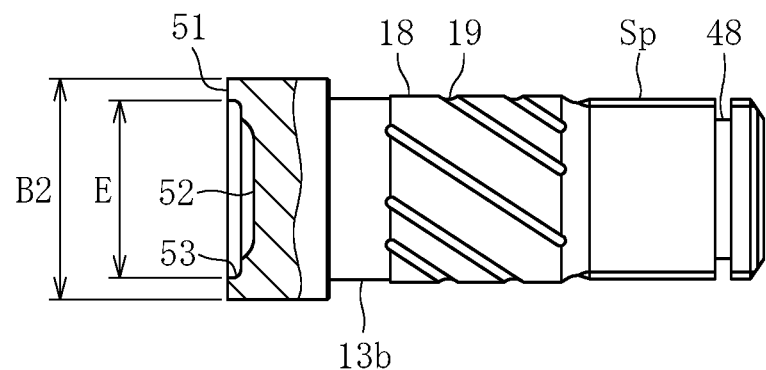
FIG. 10 is a front view for illustrating a shaft member assigned with a different product number.
Figure 11:
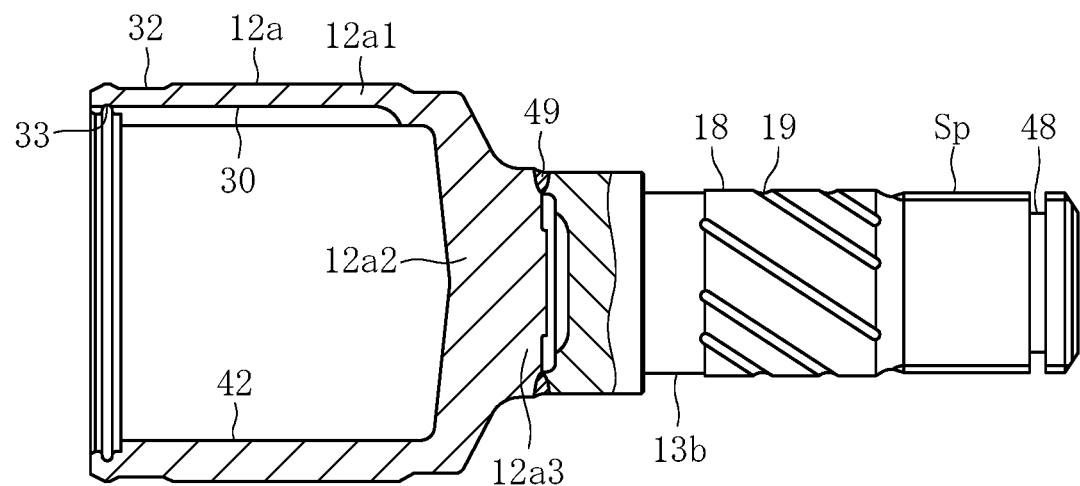
FIG. 11 is a partial vertical sectional view for illustrating an outer joint member that is manufactured using the shaft member illustrated in FIG. 10.

Next, to summarize the manufacturing concept, standardization of a product type of the cup member is additionally described while exemplifying a shaft member having a product number different from that of the above-mentioned shaft member 13*a* of the long stem type illustrated in FIG. 7. A shaft member 13*b* illustrated in FIG. 10 and FIG. 11 is used as a general stem type on the inboard side. The shaft member 13*b* has the joining end surface 51 to be brought into abutment against the joining end surface 50 (see FIG. 6*b*) of the bottom portion 12*a*2 (projecting portion 12*a*3) of the cup member 12*a*. The outer diameter B2 of the joining end surface 51 is set to the equal dimension to the outer diameter B2 of the joining end surface 51 of the shaft member 13*a* of the long stem type illustrated in FIG. 7.

The shaft member 13*b* is used as the general stem type on the inboard side. Accordingly, the shaft member 13*b* comprises a shaft section with a small length, and a sliding bearing surface 18 formed on an axial center portion thereof, and a plurality of oil grooves 19 are formed in the sliding bearing surface 18. The spline Sp and a snap ring groove 48 are formed in an end portion of the shaft member 13*b* on the side opposite to the cup member 12*a* side. As described above, even when there are differences in types, such as the general length stem type and the long stem type, and shaft diameters and outer peripheral shapes vary in each vehicle type, the diameter B2 is set to an equal dimension for each joint size.

The outer diameter B1 of the joining end surface 50 of the cup member 12*a* and the outer diameter B2 of the joining end surface 51 of the shaft member 13*a* or 13*b* are set to an equal dimension for each joint size. Thus, the cup member prepared for common use for each joint size, and the shaft member having a variety of specifications of the shaft section for each vehicle type can be prepared in a state before heat treatment. Further, the intermediate component of each of the cup member 12*a* and the shaft member 13*a* or 13*b* can be assigned with a product number for management. Even when standardizing product types of the cup member 12*a*, various types of the outer joint members 11 satisfying requirements can be produced quickly through combination of the cup member 12*a* and the shaft member 13*a* or 13*b* having a variety of specifications of the shaft section for each vehicle type. Therefore, standardization of a product type of the cup member 12*a* can reduce cost and alleviate a burden of production management.

The standardization of the product type of the cup member is described above by taking the differences in types, such as the general length stem type and the long stem type, as an example for easy understanding, but the present invention is not limited thereto. The same applies to standardization of the product type of the cup member for shaft members having a variety of specifications of the shaft section for each vehicle type among the general length stem types, and for shaft members having a variety of specifications of the shaft section for each vehicle type among the long stem types.

Figure 12:
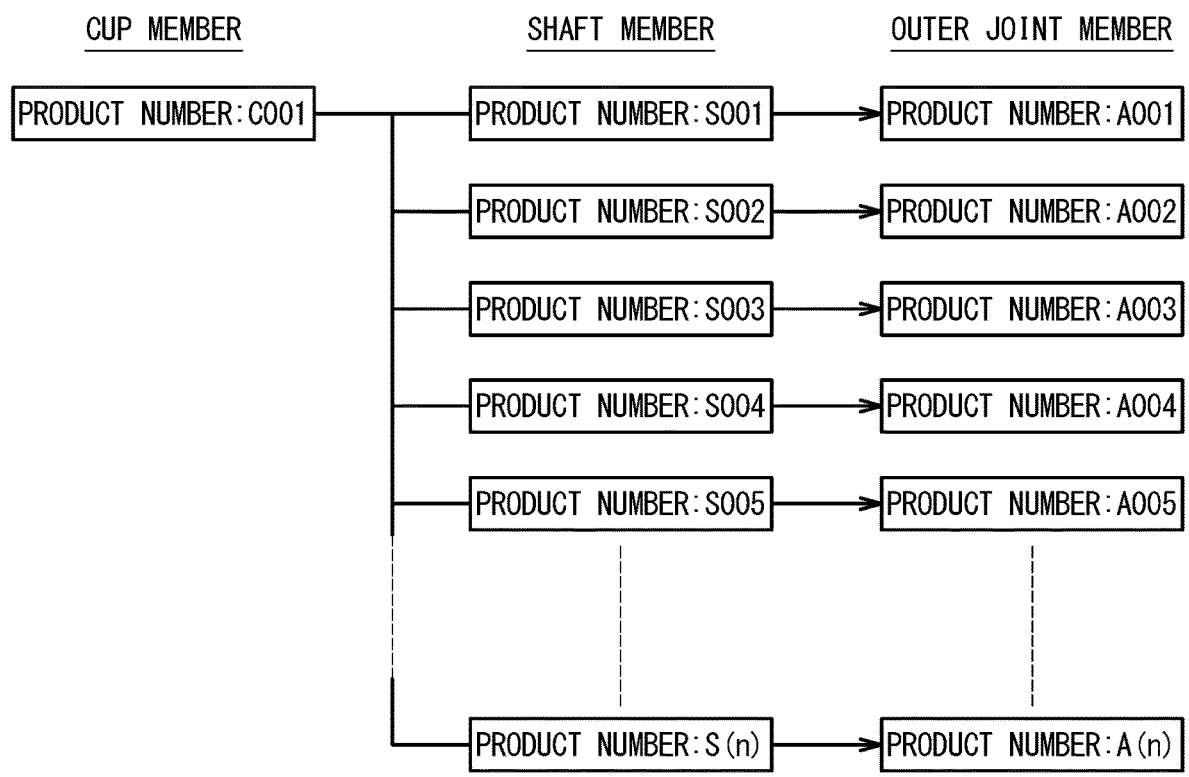
FIG. 12 is a diagram for illustrating an example of standardization of a product type of the cup member.

As a summary of the above description, FIG. 12 is a diagram for illustrating an example of standardization of a product type of the cup member according to this embodiment. As illustrated in FIG. 12, the cup member is prepared for common use for one joint size, and is assigned with, for example, a product number C001 for management. In contrast, the shaft member has a variety of specifications of the shaft section for each vehicle type, and is assigned with, for example, a product number S001, S002, or S(n) for management. For example, when the cup member assigned with the product number C001 and the shaft member assigned with the product number S001 are combined and welded to each other, the outer joint member assigned with a product number A001 can be produced. Thus, owing to standardization of a product type of the cup member, it is possible to reduce cost and to alleviate a burden of production management. In the standardization of a product type, the cup member is not limited to one type for one joint size, that is, not limited to one type assigned with a single product number. For example, the cup member comprises cup members of a plurality of types (assigned with a plurality of product numbers, respectively) that are prepared for one joint size based on different specifications of a maximum operating angle, and are each prepared so that the outer diameter B1 of the joining end surface of each of those cup members has an equal dimension.

Figure 13A:
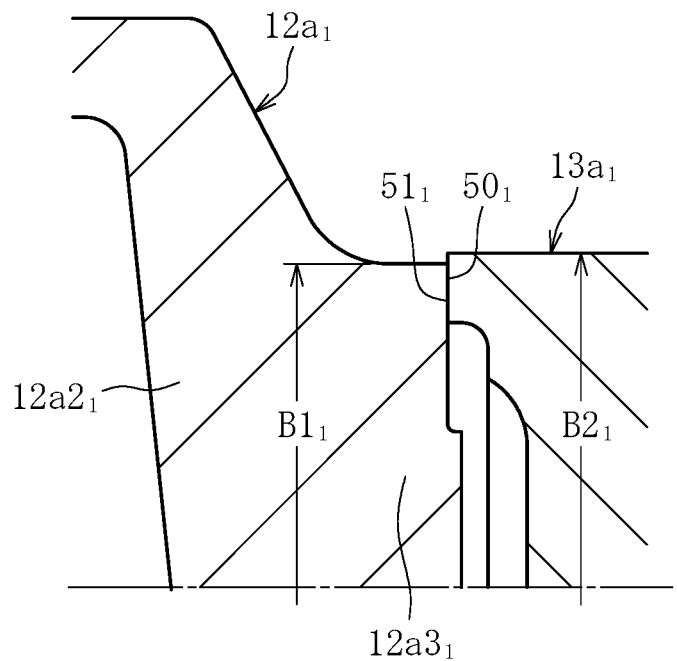
FIG. 13a is a vertical sectional view for illustrating a state of a modified example of the outer joint member according to the first embodiment before welding.
Figure 13B:
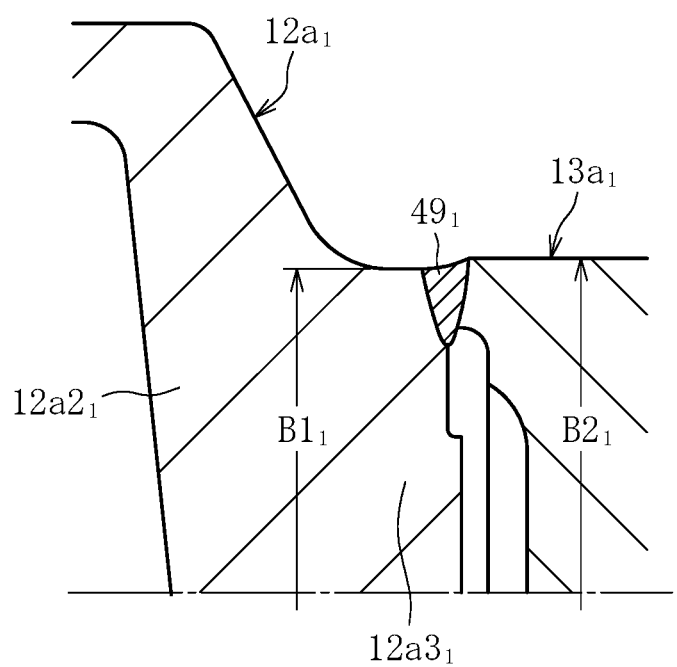
FIG. 13b is a vertical sectional view for illustrating a state of the modified example of the outer joint member according to the first embodiment after welding.

FIG. 13 are each an illustration of a modified example of the outer joint member according to the first embodiment. FIG. 13 are each an enlarged illustration of an upper portion in a radial direction in the vicinity of the welded portion. FIG. 13*a* is a vertical sectional view for illustrating a state before welding, and FIG. 13*b* is a vertical sectional view for illustrating a state after welding. In this modified example, the dimensional relationship is set to be opposite to the dimensional relationship between the outer diameter B1 of the joining end surface 50 of the cup member 12*a* and the outer diameter B2 of the joining end surface 51 of the shaft member 13*a* of the first embodiment. The other configurations of this modified example are the same as those of the first embodiment. Thus, parts that have the same functions as those of the first embodiment are denoted by the same reference symbols (except for the subscripts), and only different points are described.

As illustrated in FIG. 13*a*, in the outer joint member 11 of this modified example, contrary to the first embodiment, an outer diameter $B2_1$ of a joining end surface $51_1$ of a shaft member $13a_1$ is set to be slightly larger than an outer diameter $B1_1$ of a joining end surface $50_1$ of a cup member $12a_1$. The dimension difference between the outer diameter $B1_1$ and the outer diameter $B2_1$ is substantially the same as that of the first embodiment.

When the above-mentioned dimension difference is provided, the shrinkage of a welded portion $49_1$ welded with an electron beam is suppressed, and as illustrated in FIG. 13*a* and FIG. 13*b*, a weld configuration is obtained in which the shaft member $13a_1$ is connected to a cup member $12a_1$ gradually without recess from the outer diameter $B2_1$ of the joining end surface $51_1$ of the cup member $13a_1$ to the outer diameter $B1_1$ of the joining end surface $50_1$ of the cup member $12a_1$. With this, in the same manner as in the first embodiment, the problems of the cutaway effect of the welded portion and the reduction in joining area can be avoided, and the decrease in strength of welding can be prevented. Other features and actions, that is, the overview of the respective steps, the states of the cup member and the shaft member in the main processing steps, the preparation of the cup member for common use, the welding method, the standardization of the product type, the configuration of the outer joint member, and the like as described above in the first embodiment on the manufacturing method are the same as those of the first embodiment. Therefore, all the details of the first embodiment are applied in this embodiment to omit redundant description.

Figure 14:
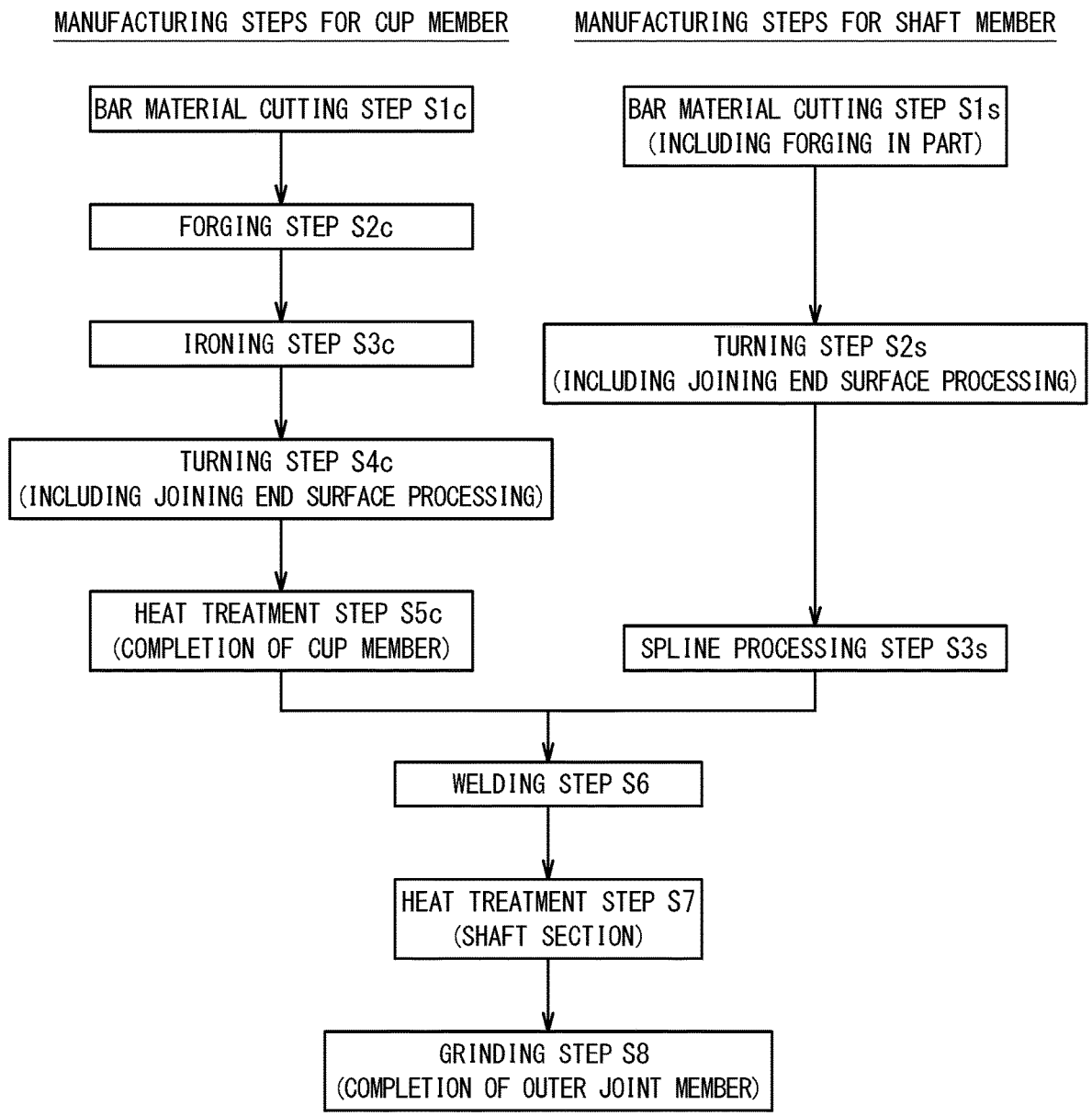
FIG. 14 is a diagram for illustrating an overview of a method of manufacturing an outer joint member according to a second embodiment of the present invention.

FIG. 14 is an illustration of a manufacturing method according to a second embodiment of the present invention. In the manufacturing steps of this embodiment, the heat treatment step for the cup member, which is involved in the heat treatment step S7 in FIG. 5 as described above in the first embodiment, is provided before the welding step S6 in the sequence and named "heat treatment step S5*c*", to thereby prepare the cup member as a finished product. Details of other aspects of the second embodiment than this aspect, that is, details of the overview of the respective steps, the states of the cup member and the shaft member in the main processing steps, the preparation of the cup member for common use, the welding method, the standardization of the product type, the configuration of the outer joint member, and the like as described above in the first embodiment on the manufacturing method are the same as those of the first embodiment. Therefore, all the details of the first embodiment are applied in this embodiment, and only the difference is described.

As illustrated in FIG. 6*b*, the cup member 12*a* has a shape extending from the joining end surface 50 to the large-diameter cylindrical portion 12*a*1 via the bottom portion 12*a*2, and the portions to be subjected to heat treatment that involves quenching and tempering are the track grooves 30 and the cylindrical inner peripheral surface 42 located at the inner periphery of the cylindrical portion 12*a*1. Therefore, the cup member 12*a* generally has no risk of thermal effect on the heat-treated portion during the welding. For this reason, the cup member 12*a* is subjected to heat treatment before the welding to be prepared as a finished component. The manufacturing steps of this embodiment are suitable in practical use.

In the manufacturing steps of this embodiment, the cup member 12*a* is subjected to heat treatment for preparing the cup member 12*a* as a finished product, and is therefore assigned with a product number indicating a finished product for management. Thus, the standardization of the product type of the cup member 12*a* remarkably reduces the cost and alleviates the burden of production management. Further, the cup member 12*a* can be manufactured solely until the cup member 12*a* is completed as a finished product through the forging, turning, and heat treatment. Thus, the productivity is enhanced by virtue of reduction of setups and the like as well.

In this embodiment, in FIG. 12 for illustrating the example of standardization of the product type of the cup member as described above in the first embodiment, only the product number of the cup member in FIG. 12 is changed to the product number indicating a finished product, whereas the product numbers of the shaft member and the outer joint member are the same as those of the first embodiment. Therefore, description thereof is omitted herein.

Figure 15:
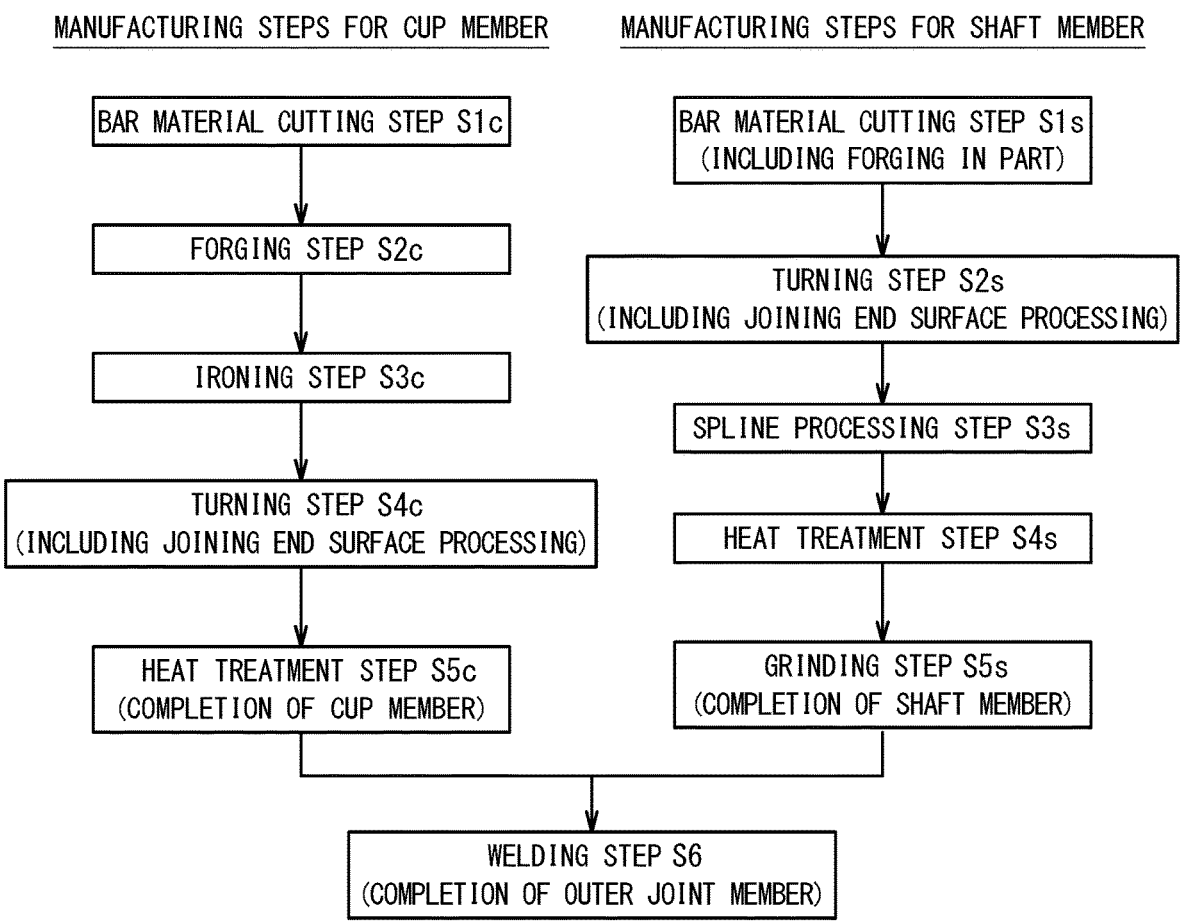
FIG. 15 is a diagram for illustrating an overview of a method of manufacturing an outer joint member according to a third embodiment of the present invention.

FIG. 15 is an illustration of a manufacturing method according to a third embodiment of the present invention. In the manufacturing steps of this embodiment, the heat treatment steps for the cup section and the shaft section, which are involved in the heat treatment step S7 in FIG. 5 as described above in the first embodiment, and the grinding step S8 for the shaft section in FIG. 5 are provided before the welding step S6 in the sequence and named "heat treatment step S5c for cup member", "heat treatment step S4s for shaft member", and "grinding step S5s". Thus, both the cup member and the shaft member are prepared as finished products. Details of other aspects of the third embodiment than this aspect, that is, details of the overview of the respective steps, the states of the cup member and the shaft member in the main processing steps, the preparation of the cup member for common use, the welding method, the standardization of the product type, the configuration of the outer joint member, and the like as described above in the first embodiment on the manufacturing method are the same as those of the first embodiment. Therefore, all the details of the first embodiment are applied in this embodiment, and only the difference is described.

After the spline processing step S3s, a hardened layer having a hardness of approximately from 50 HRC to 63 HRC is formed in a predetermined range of the outer peripheral surface of the shaft member by induction quenching in the heat treatment step S4s. Heat treatment is not performed on a predetermined portion in the axial direction, which includes the joining end surface 51 or $51_1$. The heat treatment for the cup member, the assignment of the product number, and the like are the same as those of the second embodiment on the manufacturing method, and redundant description is therefore omitted herein.

After the heat treatment step S4s, the shaft member is transferred to the grinding step S5s so that the bearing mounting surface 14 and the like are finished. Thus, the shaft member is obtained as a finished product. Then, the shaft member is assigned with a product number indicating a finished product for management. The manufacturing steps of this embodiment are suitable in a case of a cup member and a shaft member having shapes and specifications with no risk of thermal effect on the heat-treated portion during the welding.

In the manufacturing steps of this embodiment, both the cup member and the shaft member can be assigned with product numbers indicating finished products for management. Thus, the standardization of the product type of the cup member further remarkably reduces the cost and alleviates the burden of production management. Further, the cup member and the shaft member can be manufactured independently of each other until the cup member and the shaft member are completed as finished products through the forging, turning, heat treatment, grinding after heat treatment, and the like. Thus, the productivity is further enhanced by virtue of reduction of setups and the like as well.

In this embodiment, in FIG. 12 for illustrating the example of standardization of the product type of the cup member as described above in the first embodiment, the product numbers of the cup member and the shaft member in FIG. 12 are changed to the product numbers indicating finished products. The product number of the outer joint member is the same as that of the first embodiment. Therefore, description thereof is omitted herein. Note that, the cup member and the shaft member to be prepared as finished components are not limited to the cup member and the shaft member subjected to finishing such as the above-mentioned grinding after heat treatment or cutting after quenching, and encompass a cup member and a shaft member in a state in which the heat treatment is completed while the finishing is uncompleted.

As described in the standardization of the product type, the cup member is not limited to one type for one joint size, that is, not limited to one type assigned with a single product number. Specifically, as described above, the cup member encompasses, for example, cup members of a plurality of types (assigned with a plurality of product numbers, respectively) that are prepared for one joint size based on different specifications of a maximum operating angle, and are also prepared so that the outer diameter B1 of the above-mentioned joining end surfaces of the cup members are set to equal dimensions. In addition, the cup member encompasses, for example, cup members of a plurality of types (assigned with a plurality of product numbers, respectively) that are prepared for one joint size in order to achieve management of the cup members in a plurality of forms including intermediate components before heat treatment and finished components in consideration of the joint function, the circumstances at the manufacturing site, the productivity, and the like, and are also prepared so that the outer diameters B1 of the above-mentioned joining end surfaces of the cup members are set to equal dimensions.

Next, an outer joint member according to a second embodiment of the present invention is described with reference to FIG. 16 and FIG. 17. In this embodiment, parts that have the same function as those of the outer joint member according to the first embodiment are denoted by the same reference symbols(excluding subscripts), and only main points are described.

Figure 16:
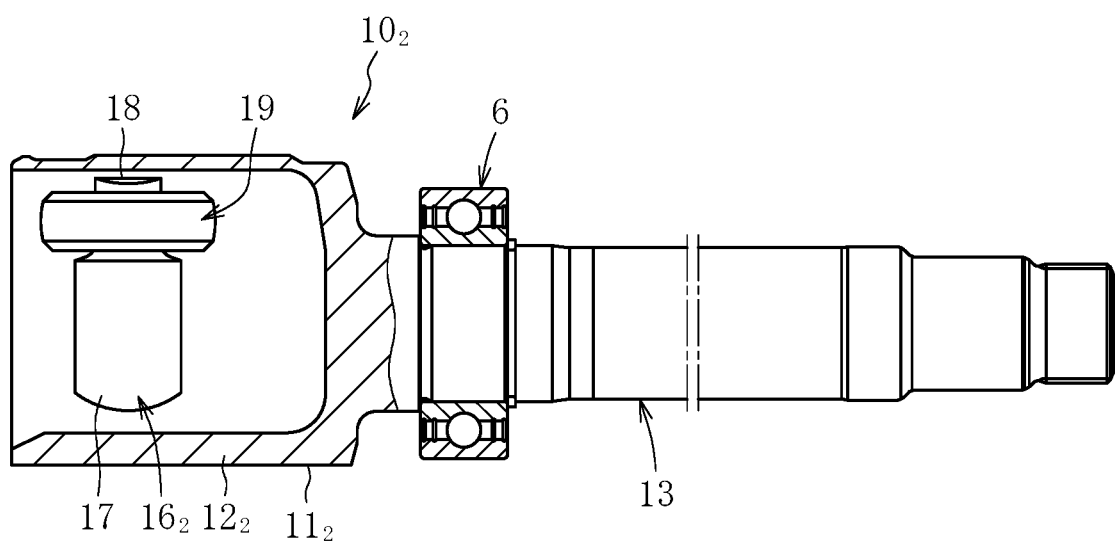
FIG. 16 is a partial vertical sectional view for illustrating a constant velocity universal joint using an outer joint member according to a second embodiment of the present invention.

A plunging type constant velocity universal joint $10_2$ illustrated in FIG. 16 is a tripod type constant velocity universal joint (TJ), and comprises an outer joint member $11_2$ comprising a cup section $12_2$ and the long stem section 13 that extends from a bottom portion of the cup section $12_2$ in the axial direction, an inner joint member $16_2$ housed along an inner periphery of the cup section $12_2$ of the outer joint member $11_2$, and rollers 19 serving as torque transmitting elements that are arranged between the outer joint member $11_2$ and the inner joint member $16_2$. The inner joint member $16_2$ comprises a tripod member 17 comprising three equiangular leg shafts 18 on which the rollers 19 are externally fitted.

Similarly to the outer joint member according to the first embodiment, the inner ring of the support bearing 6 is fixed to the outer peripheral surface of the long stem section 13, and the outer ring of the support bearing 6 is fixed to the transmission case with the bracket (not shown). The outer joint member $11_2$ is supported by the support bearing 6 in a freely rotatable manner, and thus the vibration of the outer joint member $11_2$ during driving or the like is prevented as much as possible.

Figure 17B:
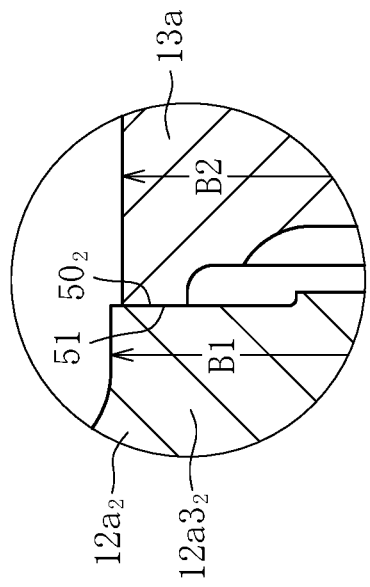
FIG. 17b is a vertical sectional view for illustrating a state of a portion "A" of FIG. 17a before welding.
Figure 17A:
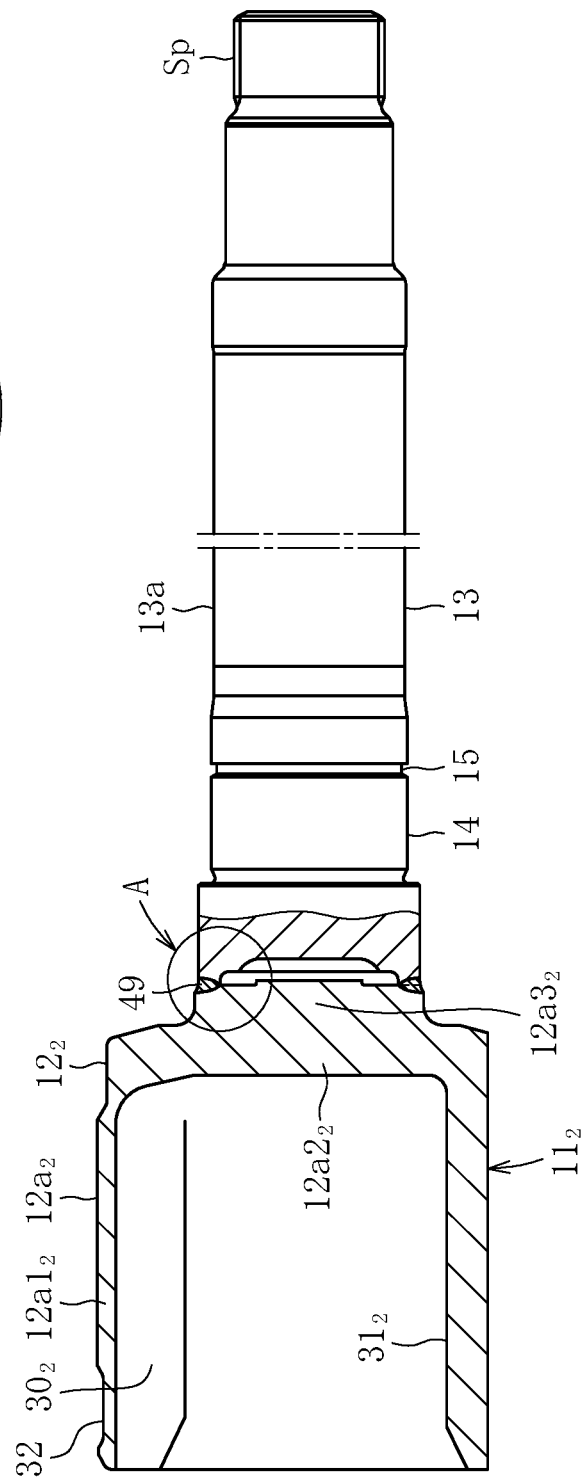
FIG. 17a is a partial vertical sectional view of the outer joint member of FIG. 16.

FIG. 17 are each an illustration of an outer joint member $11_2$. FIG. 17a is a partial vertical sectional view of the outer joint member $11_2$, and FIG. 17b is a vertical sectional view for illustrating a state of a portion "A" of FIG. 17a before welding. As illustrated in FIG. 17, the outer joint member $11_2$ comprises a bottomed cylindrical cup section $12_2$ that is opened at one end and has inner peripheral surfaces $31_2$ and the track grooves $30_2$, on which the rollers 19 (see FIG. 16) are caused to roll, formed at three equiangular positions on an inner peripheral surface of the cup section $12_2$, and the long stem section 13 that extends from a bottom portion of the cup section $12_2$ in the axial direction and comprises the spline Sp serving as the torque transmitting coupling portion formed at the outer periphery of the end portion on the opposite side to the cup section $12_2$ side. The outer joint member $11_2$ is formed by welding the cup member $12a_2$ and the shaft member 13a to each other.

As illustrated in FIG. 17, the cup member $12a_2$ is an integrally-formed product having a cylindrical portion $12a1_2$ and a bottom portion $12a2_2$. The cylindrical portion $12a1_2$ has the track grooves $30_2$ and the inner peripheral surfaces $31_2$ formed at the inner periphery thereof. A projecting portion $12a3_2$ is formed at the bottom portion $12a2_2$ of the cup member $12a2$. The boot mounting groove 32 is formed at an outer periphery of the cup member $12a_2$ on the opening side thereof. The bearing mounting surface 14 and the snap ring groove 15 are formed at the outer periphery of the shaft member $13a$ on the cup member $12a_2$ side, whereas the spline Sp is formed at the end portion on the opposite side to the cup member $12a_2$ side.

The joining end surface $50_2$ of the cup member $12a_2$ and the joining end surface 51 of the shaft member $13a$ are brought into abutment against each other and welded by electron beam welding from a radially outer side. The welded portion 49 is formed of a bead formed by a beam radiated from a radially outer side of the cup member $12a_2$. A dimension difference similar to that of the outer joint member of the first embodiment is provided between the outer diameter B1 of the joining end surface $50_2$ and the outer diameter B2 of the joining end surface 51, and the outer diameter B1 and the outer diameter B2 are respectively set to an equal dimension for each joint size. The welded portion 49 is formed on the joining end surface 51 on the cup member $12a_2$ side from the bearing mounting surface 14 of the shaft member $13a$. Therefore, the bearing mounting surface 14 and the like can be processed in advance, and hence post-processing after the welding can be omitted. The above-mentioned welding comprises electron beam welding. Thus, burrs are not generated on the joining portion. Therefore, the post-processing of the welded portion can be omitted to reduce manufacturing cost.

The details of the outer joint member according to this embodiment are the same as the details of the outer joint member according to the first embodiment, and the manufacturing method according to the first to third embodiments as described above. Therefore, all of those details are applied in this embodiment to omit redundant description.

Figure 18B:
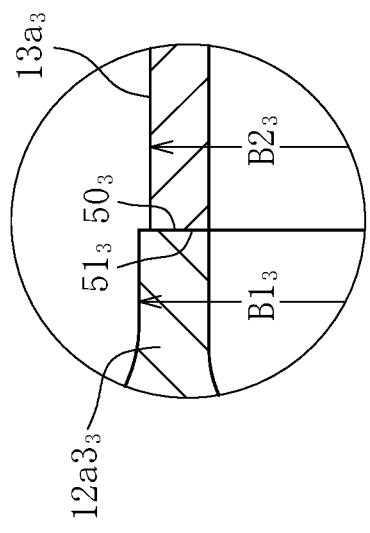
FIG. 18b is a vertical sectional view for illustrating a state of a portion "F" of FIG. 18a before welding.
Figure 18A:
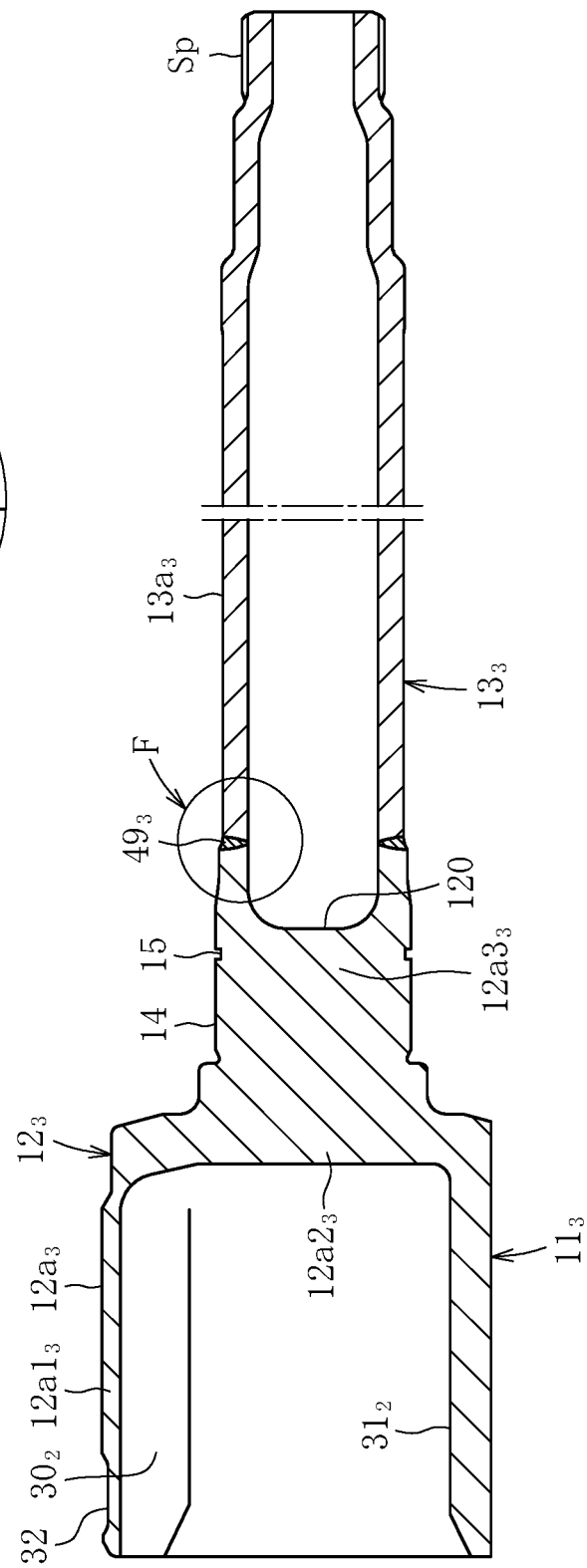
FIG. 18a is a vertical sectional view for illustrating an outer joint member according to a third embodiment of the present invention.
Figure 19:
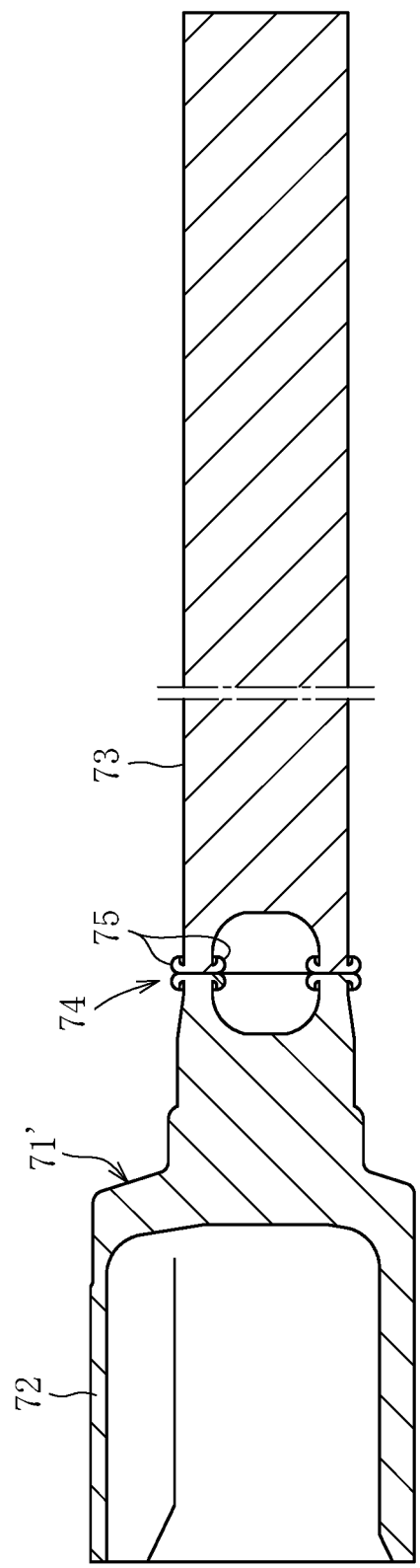
FIG. 19 is a vertical sectional view for illustrating an outer joint member according to a related art.
Figure 20:
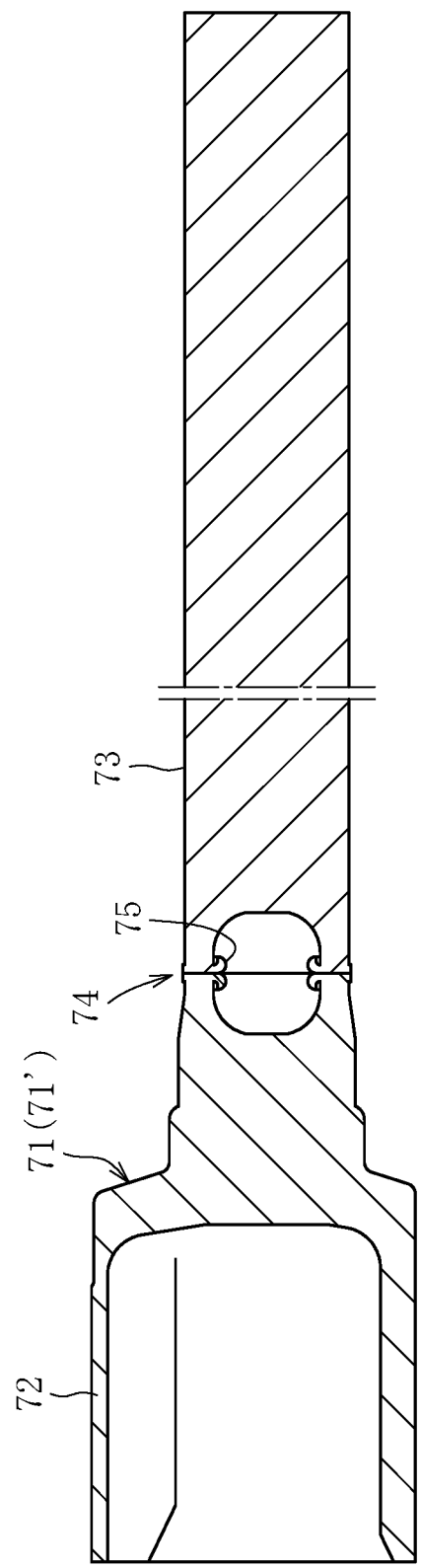
FIG. 20 is a vertical sectional view for illustrating the outer joint member according to the related art.
Figure 21:
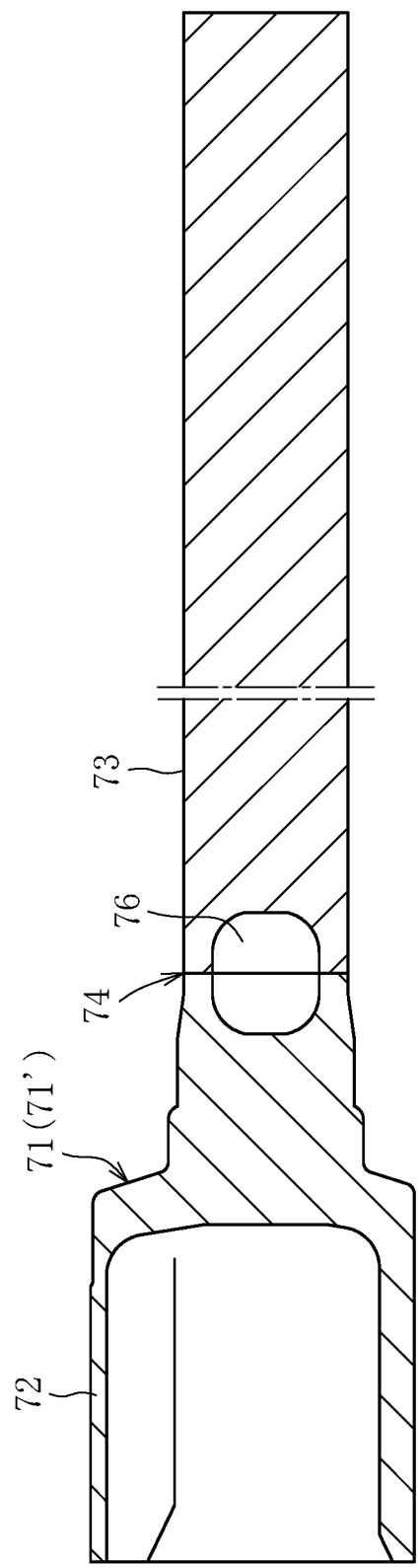
FIG. 21 is a vertical sectional view for illustrating an outer joint member according to a related art.

FIG. 18 are each an illustration of an outer joint member according to a third embodiment of the present invention. FIG. 18a is a vertical sectional view for illustrating the outer joint member, and FIG. 18b is a view for illustrating a state before welding of a portion "F" of FIG. 18a. This embodiment is different from the first embodiment in the form of the joining portion of the cup member and the form of the shaft member. Also in this embodiment, a dimension difference is provided between the outer diameter of the joining end surface of the cup member and the outer diameter of the joining end surface of the shaft member. Parts that have the same function as that of the first embodiment are denoted by the same reference symbols (except for the subscripts), and only main points are described.

An outer joint member $11_3$ of this embodiment is used for a tripod type constant velocity universal joint (see FIG. 16). The outer joint member $11_3$ is formed by welding a cup member $12a_3$ and a shaft member $13a_3$ to each other. The cup member $12a_3$ is formed of medium carbon steel, such as S53C, containing carbon of from 0.40 wt % to 0.60 wt %. The cup member $12a_3$ comprises a cylindrical portion $12a1_3$, a bottom portion $12a2_3$, and a projecting portion $12a3_3$ that is formed in the axial direction from the bottom portion $12a2_3$, and is integrally formed by forging. The projecting portion $12a3_3$ comprises a bearing mounting surface 14, a snap ring groove 15, a joining end surface $50_3$, an outer diameter $B1_3$, and a recessed portion 120 formed by turning.

The shaft member $13a_3$ is formed of a steel pipe (e.g., STKM14), and a shaft end portion thereof is reduced in diameter by swaging or the like. After that, a joining end surface $51_3$ and an outer diameter $B2_3$ are subjected to turning, and a spline Sp is formed by rolling and press working. In this embodiment, an example is illustrated in which the welding is performed after spline processing. However, the present invention is not limited thereto, and the spline processing may be performed after the welding.

As illustrated in FIG. 18b, the outer diameter $B1_3$ of the joining end surface $50_3$ of the cup member $12a_3$ is formed to be slightly larger than the outer diameter $B2_3$ of the joining end surface $51_3$ of the shaft member $13a_3$. When such dimension difference is provided, in the same manner as in the outer joint member of the first embodiment, the shrinkage of the welded portion $49_3$ (see FIG. 18a) welded with an electron beam is suppressed, and a weld configuration is obtained in which the cup member $12a_3$ is connected to the shaft member $13a_3$ gradually without recess from the outer diameter $B1_3$ of the joining end surface $50_3$ of the cup member $12a_3$ to the outer diameter $B2_3$ of the joining end surface $51_3$ of the shaft member $13a_3$. With this, the problems of the cutaway effect of the welded portion and the reduction in joining area can be avoided, and the decrease in strength of welding can be prevented.

The outer joint member $11_3$ of this embodiment comprises an intermediate position of the shaft section as a joining position between the cup member $12a_3$ and the shaft member $13a_3$, and each joining portion of the cup member $12a_3$ and the shaft member $13a_3$ has a cylindrical shape. However, in the electron beam welding, it is effective to provide a dimension difference between the outer diameter $B1_3$ of the joining end surface $50_3$ of the cup member $12a_3$ and the outer diameter $B2_3$ of the joining end surface $51_3$ of the shaft member $13a_3$. Further, the shaft member $13a_3$ has a pipe shape, and hence a hollow cavity portion is not present in the welded portion, with the result that it is not necessary to bring joining end surfaces into abutment against each other after evacuation.

In any of the above-mentioned embodiments and the modified example, as the shape of the welded portion, a dimension difference is provided between the outer diameter of the joining end surface of the cup member and the outer diameter of the joining end surface of the shaft member. Therefore, the shrinkage of the welded portion is suppressed. The problems of the cutaway effect of the welded portion and the reduction in joining area can be avoided, and the decrease in strength of welding can be prevented. As a result, the strength, quality, and reliability of the welded portion can be increased.

In the above-mentioned embodiments and the above-mentioned modified examples, the case to which electron beam welding is applied is described, but laser welding is also similarly applicable.

In the outer joint member according to the embodiments and the modified examples described above, the cases where the present invention is applied to the double-offset type constant velocity universal joint as the plunging type constant velocity universal joint 10, and to the tripod type constant velocity universal joint as the plunging type constant velocity universal joint 10 are described. However, the present invention may be applied to an outer joint member of another plunging type constant velocity universal joint such as a cross-groove type constant velocity universal joint, and to an outer joint member of a fixed type constant velocity universal joint. Further, in the above, the present invention is applied to the outer joint member of the constant velocity universal joint, which is used to construct the drive shaft. However, the present invention may be applied to an outer joint member of a constant velocity universal joint, which is used to construct a propeller shaft.

The present invention is not limited to the above-mentioned embodiments and the above-mentioned modified examples. As a matter of course, various modifications can be made thereto without departing from the gist of the present invention. The scope of the present invention is defined in Claims, and encompasses equivalents described in Claims and all changes within the scope of claims.

DESCRIPTION OF REFERENCE SIGNS 1 drive shaft
2 intermediate shaft
3 spline
4 boot
5 boot
6 support bearing
10 plunging type constant velocity universal joint
11 outer joint member
12 cup section
12a cup member
12a1 cylindrical portion
12a2 bottom portion
13 long shaft section
13a shaft member
13a" billet
13a' preform
14 bearing mounting surface
16 inner joint member
17 tripod member
19 torque transmitting element (roller)
20 fixed type constant velocity universal joint
21 outer joint member
22 inner joint member
23 torque transmitting element (ball)
24 cage
30 track groove
31 inner peripheral surface
40 track groove
41 torque transmitting element (ball)
42 cylindrical inner peripheral surface
49 welded portion
50 joining end surface
51 joining end surface
52 recessed portion
54 step portion
100 welding apparatus
101 electron gun
108 case
109 vacuum pump
111 sealed space
B1 outer diameter
B2 outer diameter
O joint center
O1 curvature center
O2 curvature center
Sp spline

The invention claimed is:

1. A method of manufacturing an outer joint member of a constant velocity universal joint, the outer joint member being constructed by forming, through use of separate members, a cup section having track grooves formed at an inner periphery of the cup section and engageable with torque transmitting elements, and a shaft section formed at a bottom portion of the cup section, and by welding a cup member forming the cup section and a shaft member forming the shaft section, the method comprising:

preparing the cup member, to have a cylindrical portion and a bottom portion that are integrally formed by forging, and forming a joining end surface on an outer surface of the bottom portion in a machining step after the forging;

preparing the shaft member to have a bearing mounting surface formed at an outer periphery of the shaft member and a joining end surface to be joined to the joining end surface of the cup member;

bringing the joining end surface of the cup member and the joining end surface of the shaft member into abutment against each other; and welding the cup member and the shaft member by radiating a beam from an outer side of the cup member to an abutment portion between the cup member and the shaft member in a radial direction of the cup member, wherein the joining end surface of the shaft member is located at a cup member side with respect to the bearing mounting surface, wherein the joining end surface of the cup member and the joining end surface of the shaft member have a dimensional difference between outer diameters thereof, and wherein the cup member and the shaft member are formed of medium carbon steel.

2. The method of manufacturing an outer joint member of a constant velocity universal joint according to claim 1, wherein the outer diameter of the joining end surface of the cup member is set to be larger than the outer diameter of the joining end surface of the shaft member.

3. The method of manufacturing an outer joint member of a constant velocity universal joint according to claim 1, wherein the outer diameter of the joining end surface of the cup member is set to an equal dimension for each joint size.

4. The method of manufacturing an outer joint member of a constant velocity universal joint according to claim 3, wherein the outer diameter of the joining end surface of the cup member is set to be larger than the outer diameter of the joining end surface of the shaft member.

* * * * *